United States Patent
Reid et al.

(10) Patent No.: US 8,365,376 B2
(45) Date of Patent: Feb. 5, 2013

(54) RIVET INSTALLATION SYSTEM

(75) Inventors: Eric M. Reid, Bothell, WA (US); Brent F. Craig, Seattle, WA (US); Riley Harrison HansonSmith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1075 days.

(21) Appl. No.: 12/272,952

(22) Filed: Nov. 18, 2008

(65) Prior Publication Data

US 2010/0122444 A1    May 20, 2010

(51) Int. Cl.
| | |
|---|---|
| *B23P 11/00* | (2006.01) |
| *B23P 19/04* | (2006.01) |
| *B25B 27/15* | (2006.01) |
| *A62B 3/00* | (2006.01) |

(52) U.S. Cl. ............... 29/243.54; 254/93 R; 29/243.5; 29/244; 29/281.1

(58) Field of Classification Search ............... 254/93 R; 29/243.5–244, 281.1
See application file for complete search history.

(56) References Cited

U.S. PATENT DOCUMENTS

| | | | |
|---|---|---|---|
| 2,395,741 A | 2/1946 | Hinkle et al. | |
| 2,411,561 A | 11/1946 | Stevens | |
| 3,585,838 A | 6/1971 | Newlon | |
| 3,908,257 A | 9/1975 | Briles | |
| 3,933,025 A | 1/1976 | Briles | |
| 4,199,814 A * | 4/1980 | Rapp et al. | 700/180 |
| 4,995,148 A | 2/1991 | Bonomi et al. | |
| 5,896,637 A * | 4/1999 | Sarh | 29/34 B |
| 6,073,326 A | 6/2000 | Banks et al. | |
| 6,088,897 A * | 7/2000 | Banks et al. | 29/243.53 |
| 6,494,307 B1 * | 12/2002 | Kozak et al. | 198/465.1 |
| 6,536,100 B2 | 3/2003 | Sarh et al. | |
| 6,843,328 B2 | 1/2005 | Boyl-Davis et al. | |
| 7,137,760 B2 * | 11/2006 | Boyl-Davis et al. | 408/1 R |
| 7,216,408 B2 | 5/2007 | Boyl-Davis et al. | |
| 2003/0116331 A1 * | 6/2003 | Boyl-Davis et al. | 173/1 |
| 2007/0036618 A1 * | 2/2007 | Fritsche et al. | 408/56 |
| 2007/0271754 A1 * | 11/2007 | Kolodziej | 29/243.51 |

OTHER PUBLICATIONS

U.S. Appl. No. 12/192,248, filed Aug. 15, 2008, Reid et al.

* cited by examiner

*Primary Examiner* — Monica Carter
*Assistant Examiner* — Nirvana Deonauth
(74) *Attorney, Agent, or Firm* — Yee & Associates, P.C.

(57) ABSTRACT

An apparatus may comprise a rail system, a multi-axis carriage, a tool module, and a controller. The rail system may be capable of being attached to a surface on a structure. The multi-axis carriage may be coupled to the rail system. The multi-axis carriage may be capable of moving along the rail system and moving a riveting tool in axes relative to the surface. The tool module may be capable of being removably coupled to the multi-axis carriage. The tool module may comprise a frame and may be capable of receiving the riveting tool. The controller may be capable of controlling movement of the riveting tool to a number of locations on the surface of the structure and may be capable of causing the riveting tool to install a number of rivets in the number of preselected locations in response to a signal.

17 Claims, 20 Drawing Sheets

RIVET INSTALLATION SYSTEM

BACKGROUND INFORMATION

1. Field

The present disclosure relates generally to manufacturing and, in particular, to manufacturing tools and automation. Still more particularly, the present disclosure relates to rail mounted tools used for manufacturing.

2. Background

Manufacturing aircraft may involve aligning different parts on structures and/or other components. Holes may be drilled through these aligned parts to prepare for attaching the parts to each other. The parts may be attached using fasteners such as, for example, without limitation, rivets, screws, bolts, pins, and other suitable fasteners.

Currently used manual riveting processes may require two operators. One operator may be located on one side of a workpiece, while the second operator may be located on the opposite side of the workpiece. The workpiece may be, for example, without limitation, a metal structure for an airframe of an aircraft. The first operator may operate a riveting tool, while the second operator may handle a bucking bar. The bucking bar may provide a structure against which a rivet may be deformed to secure parts in the workpiece to each other.

The operation performed by the first and second operator may require a high degree of operator training for consistent rivet quality. With the operators working on opposite sides of the workpiece, one operator may be unable to see actions performed by the other operator during a riveting operation. Further, the location of the first operator and second operator on opposing sides of the metal structure may also reduce the verbal communication that may occur during the load riveting operations.

One of the difficulties with these types of operations is synchronizing actions of the operators with each other. Operators working in teams may be required to learn timing that works well in performing a riveting operation. The actions and timing that may work well for one pair of operators may be different with another pair of operators.

If performed improperly, a riveting operation may require rework or replacement of skin panels and/or internal structural members in the airframe. Traditional riveting operations may require working in less than optimal conditions.

Therefore, it would be advantageous to have a method and apparatus that overcomes the issues discussed above, as well as other possible issues.

SUMMARY

In one advantageous embodiment, an apparatus may comprise a rail system, a multi-axis carriage, a tool module, and a controller. The rail system may be capable of being attached to a surface on a structure. The multi-axis carriage may be coupled to the rail system, wherein the multi-axis carriage may be capable of moving along the rail system and may be capable of moving a riveting tool in axes relative to the surface. The tool module may be capable of being removably coupled to the multi-axis carriage, wherein the tool module may comprise a frame and may be capable of receiving the riveting tool. The controller may be capable of controlling movement of the riveting tool to a number of preselected locations on the surface of the structure and may be capable of causing the riveting tool to install a number of rivets in the number of preselected locations in response to a signal.

In another advantageous embodiment, an apparatus may comprise a rail system, a multi-axis carriage, a tool module, a riveting tool, a controller, a bucking bar, a trigger system, a pressure unit, and a reaction unit. The rail system may be capable of being attached to a surface, wherein the rail system may comprise a rail or a plurality of rails. The multi-axis carriage may be coupled to the rail system, wherein the multi-axis carriage may be capable of moving along the rail system and may be capable of moving the riveting tool in axes relative to the surface. The tool module may be capable of being removably coupled to the multi-axis carriage, wherein the tool module may comprise a frame and may be capable of receiving the riveting tool. The riveting tool may be capable of being mounted to the tool module, wherein the riveting tool may be selected from one of a pneumatic rivet gun and a hydraulic rivet gun. The controller may be capable of controlling movement of the riveting tool to a number of preselected locations on the surface of a structure and may be capable of installing a number of rivets in the number of preselected locations in response to a signal. The bucking bar may be capable of communicating with the controller and may be capable of generating the signal. The trigger system may be located on the bucking bar, wherein the trigger system may have a first button and a second button that may be capable of initiating generation of the signal in response to a manipulation by an operator. The first button may be capable of generating the signal to cause the multi-axis carriage to move to a next location in the number of preselected locations. The second button may be capable of generating the signal to cause the multi-axis carriage to move to a previous location in the number of preselected locations. The pressure unit may have a number of rollers, wherein the pressure unit may be located on a first side of the tool module and may be capable of applying pressure to the surface. The reaction unit may have a number of rollers, wherein the reaction unit may be located on a second side of the tool module and may be capable of stabilizing the multi-axis carriage during operation of the tool module. The reaction unit may be capable of stabilizing the multi-axis carriage while the multi-axis carriage moves along the rail system. The surface may be for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a pressure vessel, and a building.

In yet another advantageous embodiment, a method may be present for performing riveting operations on a structure. A riveting tool mounted to a rail apparatus may be moved on a first surface of the structure to a preselected location within a number of preselected locations on the first surface of the structure in response to a signal to form a current preselected location. The rail apparatus may comprise a rail system capable of being attached to a surface, and a multi-axis carriage may be coupled to the rail system. The multi-axis carriage may be capable of moving along the rail system and may be capable of moving the riveting tool in axes relative to the surface. A tool module may be capable of being removably coupled to the multi-axis carriage, wherein the tool module may comprise a frame and may be capable of receiving the riveting tool. A controller may be capable of controlling movement of the riveting tool to the number of preselected locations on the surface of the structure and may be capable of causing the riveting tool to install a number of rivets in the number of preselected locations in response to a signal. A rivet may be installed at the current preselected location with a backing unit located at the current preselected location on a second surface on the structure opposite to the first surface.

In a further advantageous embodiment, a method may be present for performing riveting operations on a structure. A number of hanger brackets may be placed on a first surface of the structure. A rail system for a rail apparatus may be attached to the number of hanger brackets, wherein the rail apparatus may comprise the rail system capable of being attached to the first surface when activated. The multi-axis carriage may be coupled to the rail system, wherein the multi-axis carriage may be capable of moving along the rail system and may be capable of moving a riveting tool in axes relative to the first surface. A tool module may be capable of being removably coupled to the multi-axis carriage, wherein the tool module may comprise a frame and may be capable of receiving the riveting tool. A controller may be capable of controlling movement of the riveting tool to a number of preselected locations on the surface of the structure and may be capable of causing the riveting tool to install a number of rivets in the number of preselected locations in response to a signal. The multi-axis carriage may be attached to the rail system. The tool module may be coupled to the multi-axis carriage. A tool may be mounted to the tool module. A backing unit may be positioned at a current preselected location. The signal may be generated in response to a pressing of a button. The riveting tool mounted to the rail apparatus may be moved on the first surface of the structure to a preselected location within the number of preselected locations on the first surface of the structure in response to the signal to form the current preselected location. A rivet may be installed at the current preselected location with the backing unit located at the current preselected location on a second surface on the structure opposite to the first surface.

The features, functions, and advantages may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
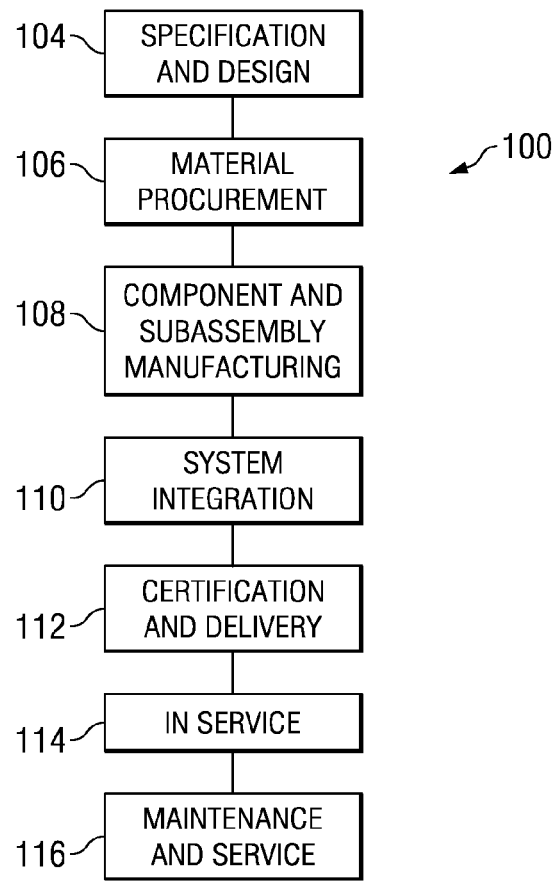
FIG. 1 is a diagram of an aircraft manufacturing and service method in accordance with an advantageous embodiment.
Figure 2:
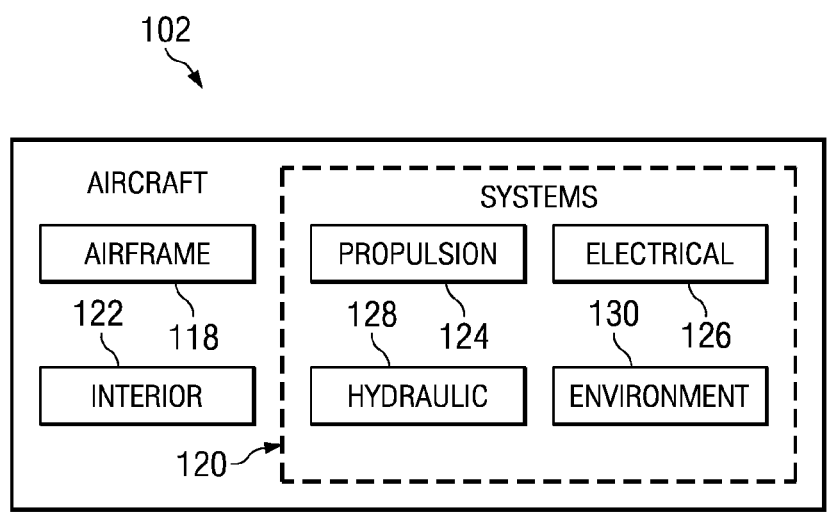
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and in aircraft 102 as shown in FIG. 2. During pre-production, aircraft manufacturing and service method 100 may include specification and design 104 of aircraft 102 and material procurement 106.

During production, component and subassembly manufacturing 108 and system integration 110 of aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, for example, without limitation, any number of aircraft manufacturers and major-system subcontractors; a third party may include, for example, without limitation, any number of venders, subcontractors, and suppliers; and an operator may be, for example, without limitation, an airline, leasing company, military entity, service organization, or other suitable entity.

As shown in FIG. 2, aircraft 102 produced by aircraft manufacturing and service method 100 may include airframe 118, a plurality of systems 120, and interior 122. Examples of systems 120 include one or more of propulsion system 124, electrical system 126, hydraulic system 128, and environmental system 130. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 108 may be fabricated or manufactured in a manner similar to components or subassemblies produced while aircraft 102 is in service.

Also, one or more apparatus embodiments, method embodiments, or a combination thereof may be utilized during component and subassembly manufacturing 108 and system integration 110, for example, without limitation, by substantially expediting assembly of or reducing the cost of aircraft 102. Similarly, one or more of apparatus embodiments, method embodiments, or a combination thereof may be utilized while aircraft 102 is in service, for example, without limitation, to maintenance and service 116.

The different advantageous embodiments recognize and take into account that the currently used techniques for the installation of rivets may be time consuming and may be subject to errors that may require rework. This rework may increase the time and expense needed to manufacture an aircraft.

Further, the different advantageous embodiments recognize that large machine riveting tools may be used to install rivets on objects such as, for example, an airframe. The different advantageous embodiments, however, recognize and take into account that large machine rivet tools may be high in cost and may require large areas of fixed floor space.

The different advantageous embodiments recognize and take into account that the use of these types of tools may not be feasible for certain parts of an aircraft. For example, without limitation, the different advantageous embodiments recognize and take into account that as an aircraft is assembled, the subassemblies may become too large for standard c-frame squeezes or large machine tools to gain access for riveting. C-frame squeezes may require tools capable of squeezing both sides of a rivet to install the rivet. The different advantageous embodiments recognize that a c-frame squeeze tool may be difficult to use if access to both sides of the part is limited.

The different advantageous embodiments recognize that for areas such as, for example, without limitation, fuselage laps, splices, circumferential joins, wing panel assemblies, and/or other areas, may not be suitable for large machine riveting.

With these types of areas, manual and/or hand riveting may be the only option. The different advantageous embodiments recognize and take into account that another option may be to redesign the structure for a different type of fastening system that may use mechanical fasteners other than rivets. The different advantageous embodiments, however, recognize and take into account that this option may result in increased weight or be otherwise undesirable.

Thus, the different advantageous embodiments provide a method and apparatus for rivet installation. A flexible rail system may be capable of being attached to a surface. A multi-axis carriage may be coupled to the flexible rail system. The multi-axis carriage may be capable of moving along the flexible rail system and may be capable of moving a riveting tool in axes relative to the surface.

A tool module may be capable of being removably coupled to the multi-axis carriage. The tool module may comprise a frame and may be capable of receiving the riveting tool. A controller may be capable of controlling movement of the riveting tool to a number of preselected locations on the structure and may be capable of installing a number of rivets in the number of preselected locations in response to a signal.

The different advantageous embodiments also may include a backing unit that may be capable of communicating with the controller. The backing unit may be capable of generating the signal to control movement of the riveting tool and installation of rivets.

Figure 3:
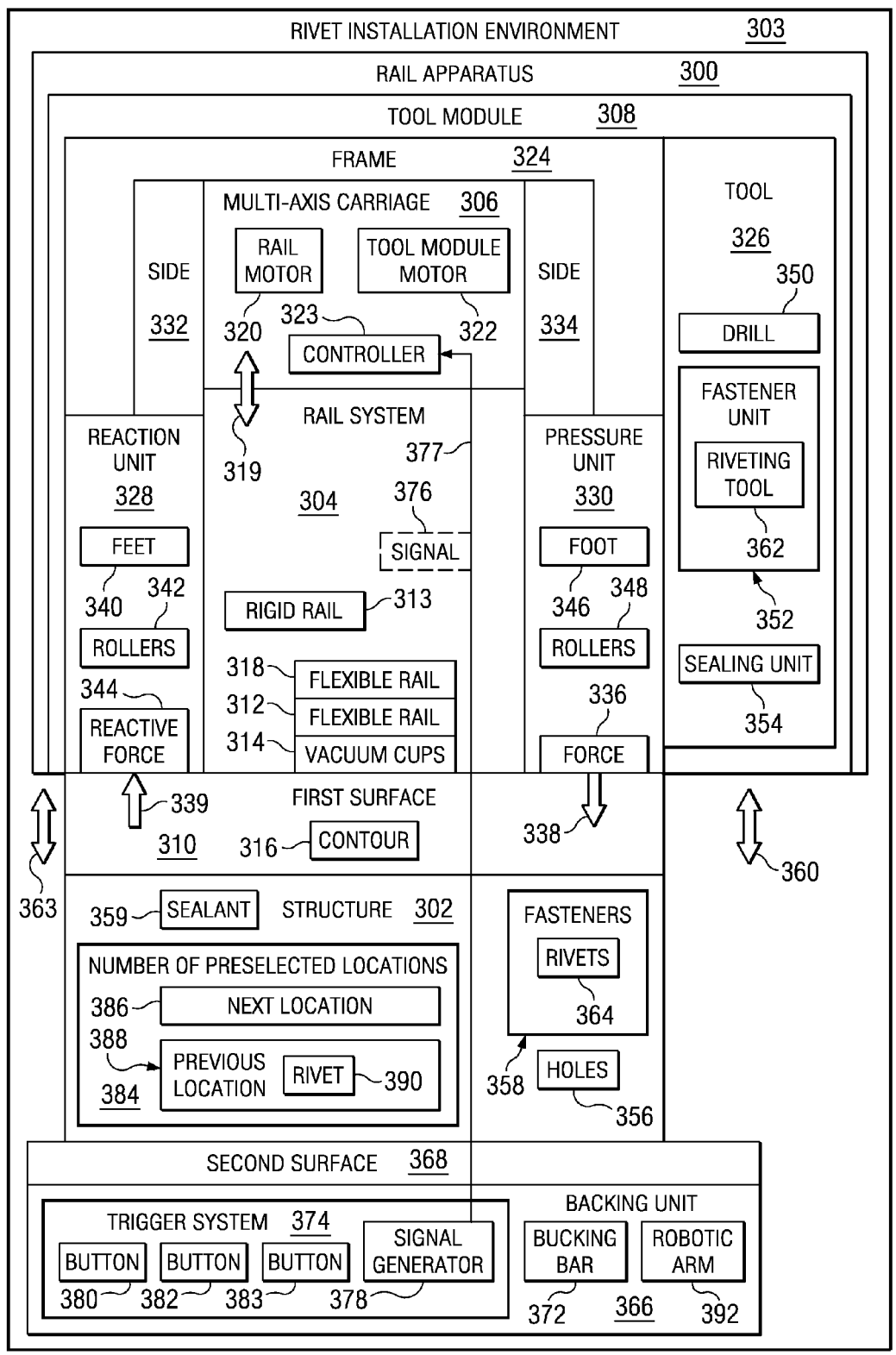
FIG. 3 is a block diagram of a rivet installation environment in accordance with an advantageous embodiment.

With reference now to FIG. 3, a block diagram of a rivet installation environment is depicted in accordance with an advantageous embodiment. Rail apparatus 300 is an example of an apparatus that may be used to perform operations on structure 302 within rivet installation environment 303.

In these examples, structure 302 may take various forms. For example, without limitation, structure 302 may be an object such as, for example, without limitation, a part, a subassembly, a system, or some other structure. Structure 302 may be, for example, without limitation, multiple parts aligned to each other for an operation to be performed using rail apparatus 300. Structure 302 may be, for example, without limitation, a fuselage, a wing, a tail, an aircraft door, an aircraft empennage, an engine housing, an aircraft control surface, a portion of the prior structures, or some other suitable object.

Rail apparatus 300 may include rail system 304, multi-axis carriage 306, and tool module 308. Rail system 304 may be removably coupled or attached to first surface 310 of structure 302. In these examples, rail system 304 may be comprised of flexible rail 312, which may be attached to first surface 310 of structure 302 using vacuum cups 314. Of course, in other advantageous embodiments, rail system 304 may be implemented using rigid rail 313. Whether rigid rail 313 or flexible rail 312 is used may depend on the particular implementation.

With flexible rail 312, rail apparatus 300 may be attached to contour 316 in first surface 310 of structure 302. Contour 316 may be, for example, without limitation, a curve in a fuselage. Contour 316 may be a complex and/or compound curve.

With the use of flexible rail 312 by itself, issues with maintaining two or more rails parallel to each other with appropriate space settings may be avoided. Additionally, flexible rail 312 also may avoid issues that may occur with dual rails that follow complex contours. These types of contours may result in undesirable stress on multi-axis carriage 306. Rail apparatus 300 may also minimize positioning inaccuracies. Further, with the use of only flexible rail 312, less space, cost, and/or weight may be present in rail apparatus 300.

In other advantageous embodiments, flexible rail 318 also may be present within rail system 304. Flexible rail 318 and flexible rail 312 may be used to provide a larger working area than may be provided with just flexible rail 312. With a larger working area, larger hole patterns may be completed. Further, the use of both flexible rail 312 and flexible rail 318 may provide increased clamping capability and stability.

Multi-axis carriage 306 may be coupled to flexible rail 312 as shown by arrow 319. Multi-axis carriage 306 may include rail motor 320, tool module motor 322, and controller 323. Rail motor 320 may move multi-axis carriage 306 along flexible rail 312. This movement may move multi-axis carriage 306 along an axis, such as x-axis 363. Tool module motor 322 may be used to move tool module 308 along an axis, such as a y-axis.

Controller 323 may control the movement and operation of rail apparatus 300 with respect to structure 302. Controller 323 may be, for example, without limitation, a computer, an application to an application specific integrated circuit (ASIC), a control circuit, a processor, multiple processors, and/or some other suitable device.

In these illustrative examples, tool module 308 may be removably coupled to multi-axis carriage 306. Tool module 308 may include frame 324 and tool 326. Tool 326 may be mounted on frame 324. Additionally, tool 326 also may be removably mounted to frame 324, allowing tool 326 to be exchanged with another tool.

In this example, tool module 308 also may include reaction unit 328 and pressure unit 330. Reaction unit 328 may be located on side 332 of frame 324, while pressure unit 330 may be located on side 334 of frame 324. In this manner, reaction unit 328 and pressure unit 330 may be located opposite to each other on tool module 308. Further, these two units may be located on opposite sides of flexible rail 312.

Reaction unit 328 may be capable of stabilizing multi-axis carriage 306 during movement of multi-axis carriage 306 along flexible rail 312. Further, reaction unit 328 also may be capable of stabilizing multi-axis carriage 306 during operation of tool 326. In these examples, pressure unit 330 may provide a capability of providing force 336 that is normal to first surface 310 as illustrated by arrow 338.

Reaction unit 328 may contact first surface 310 continuously or only during certain operations. Reaction unit 328 may generate reactive force 344 in the direction of arrow 339 to counter force 336. Reaction unit 328 may include feet 340 and/or rollers 342. Reaction unit 328 may provide reactive force 344, which may be applied to first surface 310. Reactive force 344 may be applied during movement of multi-axis carriage 306 along flexible rail 312 to stabilize multi-axis carriage 306.

For example, without limitation, feet 340 may be placed onto first surface 310 each time a position is reached on first surface 310 of structure 302 for an operation. In other advantageous embodiments, rollers 342 may provide constant application of reactive force 344 while multi-axis carriage 306 moves along first surface 310 of structure 302. In yet other advantageous embodiments, a combination of feet 340 and rollers 342 may be used.

Additionally, reaction unit 328 may provide reactive force 344 to counter or provide stability to multi-axis carriage 306 during drilling operations and/or in response to force 336 being generated by pressure unit 330. Pressure unit 330 may include foot 346 and/or rollers 348. Pressure unit 330 may generate force 336. In addition to generating force 336, rollers 348 may allow for further stabilization of multi-axis carriage 306 during movement as well as provide additional contributions to force 336.

In this example, pressure unit 330 may generate force 336 prior to tool 326 performing drilling operations on structure 302. In these examples, tool 326 may take various forms. For example, without limitation, tool 326 may be drill 350, fastener unit 352, sealing unit 354, and/or some other suitable device. Drill 350 may be used to drill holes 356 into structure 302. Fastener unit 352 may be used to apply fasteners 358 to structure 302. Sealing unit 354 may be used to apply sealant 359 to structure 302 to holes 356.

Further, pressure unit 330, along with tool 326, may be moveable about a-axis 360. This a-axis may be parallel to x-axis 363, along which multi-axis carriage 306 moves when moving along flexible rail 312. By allowing pressure unit 330 and/or tool 326 to move about a-axis 360, tool 326 may be maintained in a position that is normal to first surface 310 for performing different operations.

Further, pressure unit 330 and/or tool 326 may be locked into place to fix these components with respect to a-axis 360 during an operation. When rail apparatus 300 is used for riveting operations, fastener unit 352 may take the form of riveting tool 362, and fasteners 358 may take the form of rivets 364. Riveting tool 362 may be, for example, without limitation, a pneumatic rivet gun and/or a hydraulic rivet gun, depending on the particular implementation.

Rivet installation environment 303 also may include backing unit 366. Backing unit 366 may be an object that provides second surface 368 to receive an impact force generated in installing rivets 364 in structure 302. In these examples, backing unit 366 may take the form of bucking bar 372. Backing unit 366 may include trigger system 374, which may be capable of generating signal 376 using signal generator 378.

Signal 376 may be sent to controller 323 through communications link 377. Communications link 377 may be, for example, without limitation, a wired communications link and/or a wireless communications link.

Signal generator 378 may generate signal 376 in response to an operator input to trigger system 374. For example, without limitation, trigger system 374 may include button 380 and/or button 382. These buttons may be used to generate signal 376 to move tool 326 to a number of preselected locations in a number of preselected locations 384 on the structure, and to install rivets in a number of preselected locations 384. In yet other advantageous embodiments, button 383 may be present in trigger system 374. Button 383 may be activated by an operator to cause riveting tool 362 to perform a riveting operation. Of course, any number of buttons may be used for trigger system 374, depending on the particular implementation.

In yet another example, button 380 may be activated by an operator to control the duration of riveting performed by riveting tool 362. Releasing button 380 may cause riveting tool 362 to stop performing a riveting operation. In other advantageous embodiments, activation of button 380 may cause riveting tool 362 to perform a riveting operation with riveting tool 362 ceasing operation after some period of time.

For example, without limitation, an operator activating button 380 may generate signal 376 to move riveting tool 362 to next location 386 in a number of preselected locations 384. Activation of button 382 may be used to move riveting tool 362 to previous location 388 in a number of preselected locations 384.

An operator may move riveting tool 362 to next location 386 when a rivet within rivets 364 has been installed in the current location of riveting tool 362. Button 382 may be used to move riveting tool 362 to previous location 388. For example, without limitation, rivet 390 at previous location 388 may need additional impact force to properly secure rivet 390. An operator may notice that rivet 390 in previous location 388 has not been completely processed to secure structure 302.

In yet another advantageous embodiment, trigger system 374 may allow an operator to select an order in which rivets 364 may be installed. In yet other advantageous embodiments, trigger system 374 may provide additional controls such as, for example, without limitation, allowing an operator to move riveting tool 362 to any number of locations within a number of preselected locations 384.

In the different advantageous embodiments, backing unit 366 may be a handheld unit that may be manipulated by an operator. In other advantageous embodiments, backing unit 366 may include robotic arm 392, which may move backing unit 366 to a location within a number of preselected locations 384 corresponding to a location of riveting tool 362 within a number of preselected locations 384.

With the use of multi-axis carriage 306 and tool module 308, a reconfiguration capability may be provided for rail apparatus 300. This capability may allow for reconfiguration of rail apparatus 300 to perform different types of operations by minimizing the time needed for reconfigurations. In contrast to currently available flexible rail systems, rail apparatus 300 may be reconfigured by changing tool module 308.

Tool module 308 may be removed and/or detached from multi-axis carriage 306. For example, without limitation, if tool module 308 includes drill 350, after drilling holes 356 in structure 302, tool module 308 may be removed and another version of tool module 308 may be attached to multi-axis carriage 306 to fasten parts for pieces of structure 302. Further, with this type of configurability, less expense may be needed for rail apparatus 300, because the motors and components in multi-axis carriage 306 may not have to be replicated for each type of tool.

Further, the capability to rotate tool 326 and pressure unit 330 about a-axis 360 in rail apparatus 300 may allow control pressure unit 330 to position pressure unit 330 and tool 326 substantially normal to first surface 310. The change in a-axis 360 only occurs, in these examples, during pressure unit 330 clamping or changing to allow for normalization when multi-axis carriage 306 moves to another position.

Further, the different advantageous embodiments provided by reaction unit 328 may allow for easier placement of rail apparatus 300 on structure 302, because only a single flexible rail, such as flexible rail 312, may be needed, rather than two or more rails. Further, by using only flexible rail 312, the cost of rail apparatus 300 also may be reduced.

The illustration of rail apparatus 300 in FIG. 3 is not meant to imply physical or architectural limitations to the manner in which different advantageous embodiments may be implemented. This illustration of rail apparatus 300 in FIG. 3 is provided for purposes of illustrating some features that may be found in different advantageous embodiments.

For example, without limitation, in other advantageous embodiments, rail system 304 may include two or more flexible rails rather than just flexible rail 312. In another advantageous embodiment, backing unit 366 may be part of another flexible rail apparatus located on an opposite side of first surface 310 of structure 302 from rail apparatus 300.

In yet other advantageous embodiments, tool module motor 322 may be located within tool module 308 rather than within multi-axis carriage 306.

Further, although tool 326 has been described with respect to drill 350, fastener unit 352, and sealing unit 354, tool 326 may include other types of tools in other advantageous embodiments. For example, without limitation, tool 326 may include one or more tools in addition to or in place of these. These tools may include, for example, without limitation, a drill, a measurement probe, a rivet hammer, a router, a trimming saw, a mill, a grinding wheel, and/or some other suitable tool.

In still other advantageous embodiments, multi-axis carriage 306 may omit rail motor 320 and tool module motor 322. In this type of embodiment, an operator may move tool 326 to locations within a number of preselected locations 384 to perform operations at those locations. Another operator may handle backing unit 366 and initiate riveting through trigger system 374, or trigger system 374 may be located on frame 324 to provide the operator of multi-axis carriage 306 a capability to initiate riveting operations.

With this type of implementation, trigger system 374 may be located on frame 324 under the control of a human operator. Trigger system 374 may be configured in this type of implementation to activate riveting tool 362 to perform a riveting operation after the human operator has positioned riveting tool 362 over a particular location in a number of preselected locations 384 by manually manipulating multi-axis carriage 306.

Although the different advantageous embodiments described in this example are with respect to aircraft and aircraft parts, other advantageous embodiments may be applied for use in performing operations on other types of structures or workpieces.

FIGS. 4-8 illustrate the installation of a flexible rail apparatus such as, for example, without limitation, rail apparatus 300 in FIG. 3.

Figure 4:
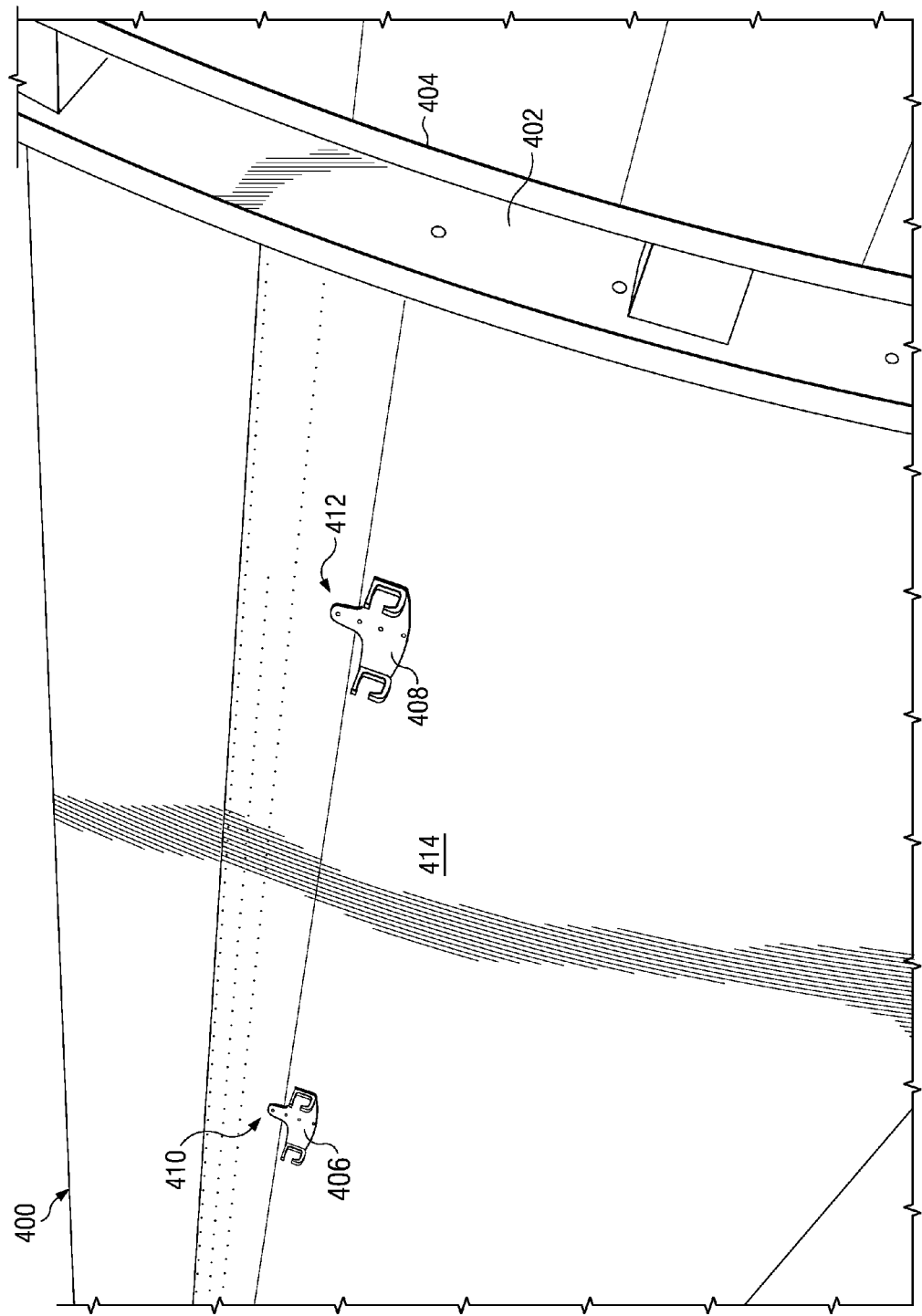
FIG. 4 is a diagram illustrating one example of a rivet installation environment in accordance with an advantageous embodiment.

With reference now to FIG. 4, a diagram illustrating one example of a rivet installation environment is depicted in accordance with an advantageous embodiment. Rivet installation environment 400 includes workpiece 402, which may be airframe 404.

In this illustrative example, hanger bracket 406 and hanger bracket 408 may have been installed at locations 410 and 412 on surface 414 of airframe 404.

Locations 410 and 412 may be locations at which rivets are to be installed. Locations 410 and 412 may form index locations that allow controller 323 in FIG. 3 to identify any location within a number of preselected locations 384 in FIG. 3. Controller 323 in FIG. 3 may identify locations 410 and 412 based on locating hanger brackets 406 and 408 in these examples.

Figure 5:
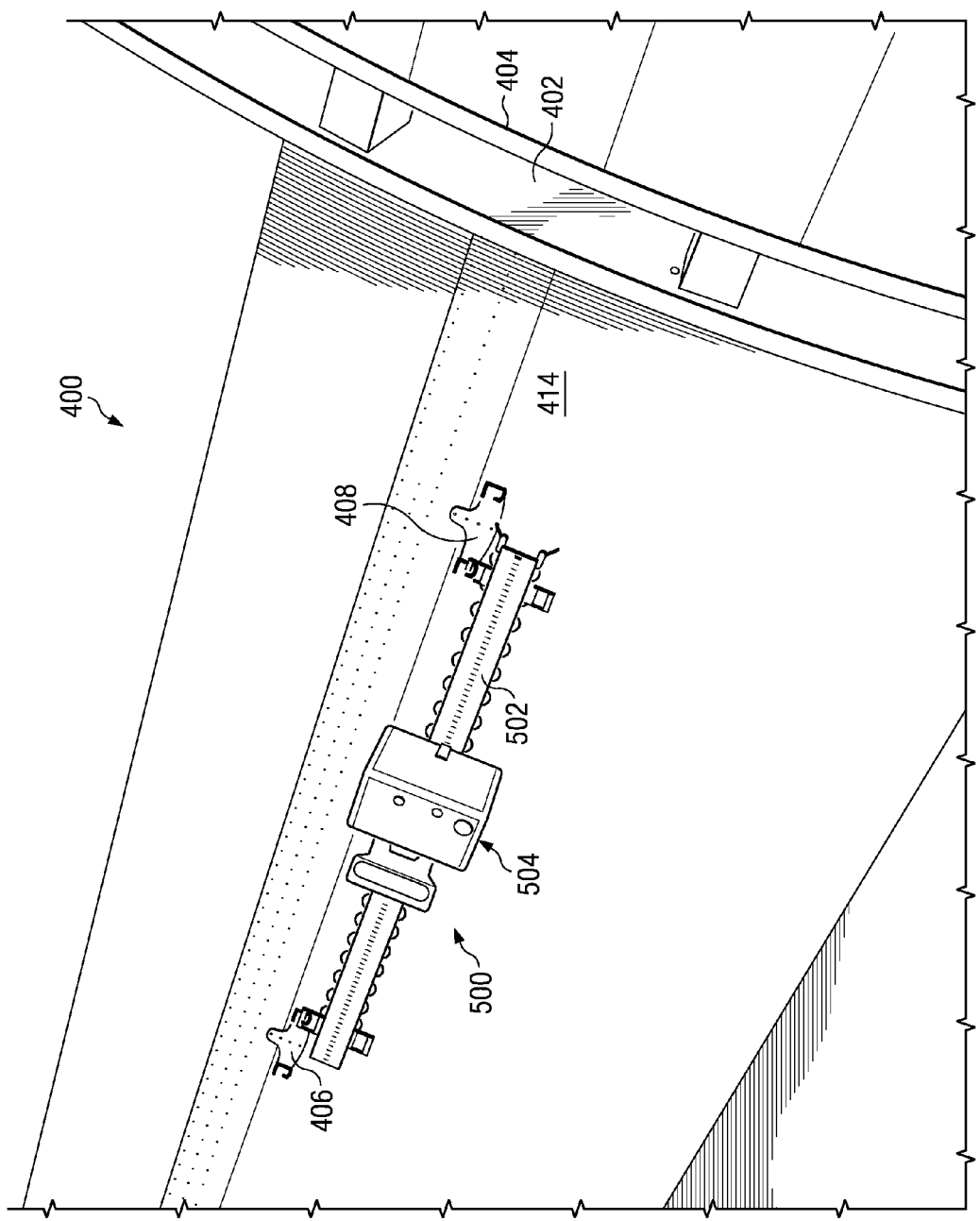
FIG. 5 is a diagram of a rivet installation environment in accordance with an advantageous embodiment.

With reference now to FIG. 5, a diagram of a rivet installation environment is depicted in accordance with an advantageous embodiment. In this example, a portion of flexible rail system 500 has been installed onto surface 414 of workpiece 402. In this state, flexible rail system 500 may secure itself to surface 414. Hanger bracket 406 and hanger bracket 408 may now be used for fall retention in case vacuum is lost by flexible rail system 500.

In this example, flexible rail system 500 may be attached to workpiece 402. Flexible rail system 500 may have flexible rail 502. In this illustrative example, flexible rail 502 may be attached to surface 414 of airframe 404 through hanger brackets 406 and 408. In these examples, flexible rail 502 may be a flexible vacuum rail. With this type of flexible rail, a vacuum is initiated to secure flexible rail 502 to surface 414 of airframe 404.

Multi-axis carriage 504 also may be attached to flexible rail 502 on flexible rail system 500. Multi-axis carriage 504 may be attached to flexible rail 502 when flexible rail 502 is connected to hanger brackets 406 and 408. In other advantageous embodiments, multi-axis carriage 504 may be attached to flexible rail 502 after flexible rail 502 has been attached to hanger brackets 406 and 408.

Figure 6:
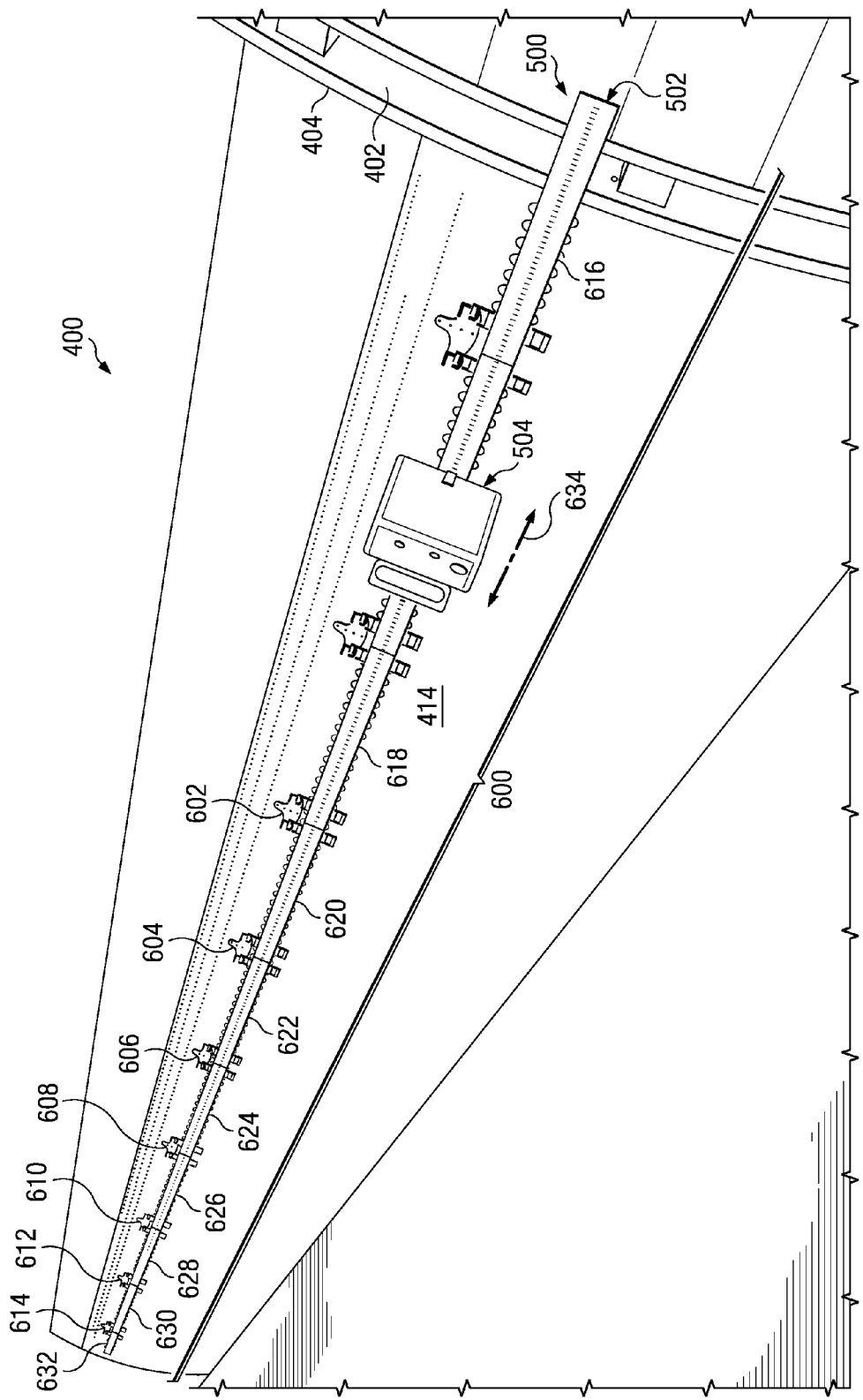
FIG. 6 is a diagram of a rivet installation environment in accordance with an advantageous embodiment.

With reference now to FIG. 6, a diagram of a rivet installation environment is depicted in accordance with an advantageous embodiment. In this example, length 600 of flexible rail 502 may be extended by mounting hanger brackets 602, 604, 606, 608, 610, 612, and 614 on surface 414 of workpiece 402. Track segments 616, 618, 620, 622, 624, 626, 628, 630, and 632 may be added to flexible rail system 500 to extend length 600 of flexible rail 502. In this manner, multi-axis carriage 504 may move along length 600 of flexible rail 502 in direction 634 during rivet installation operations.

Figure 7:
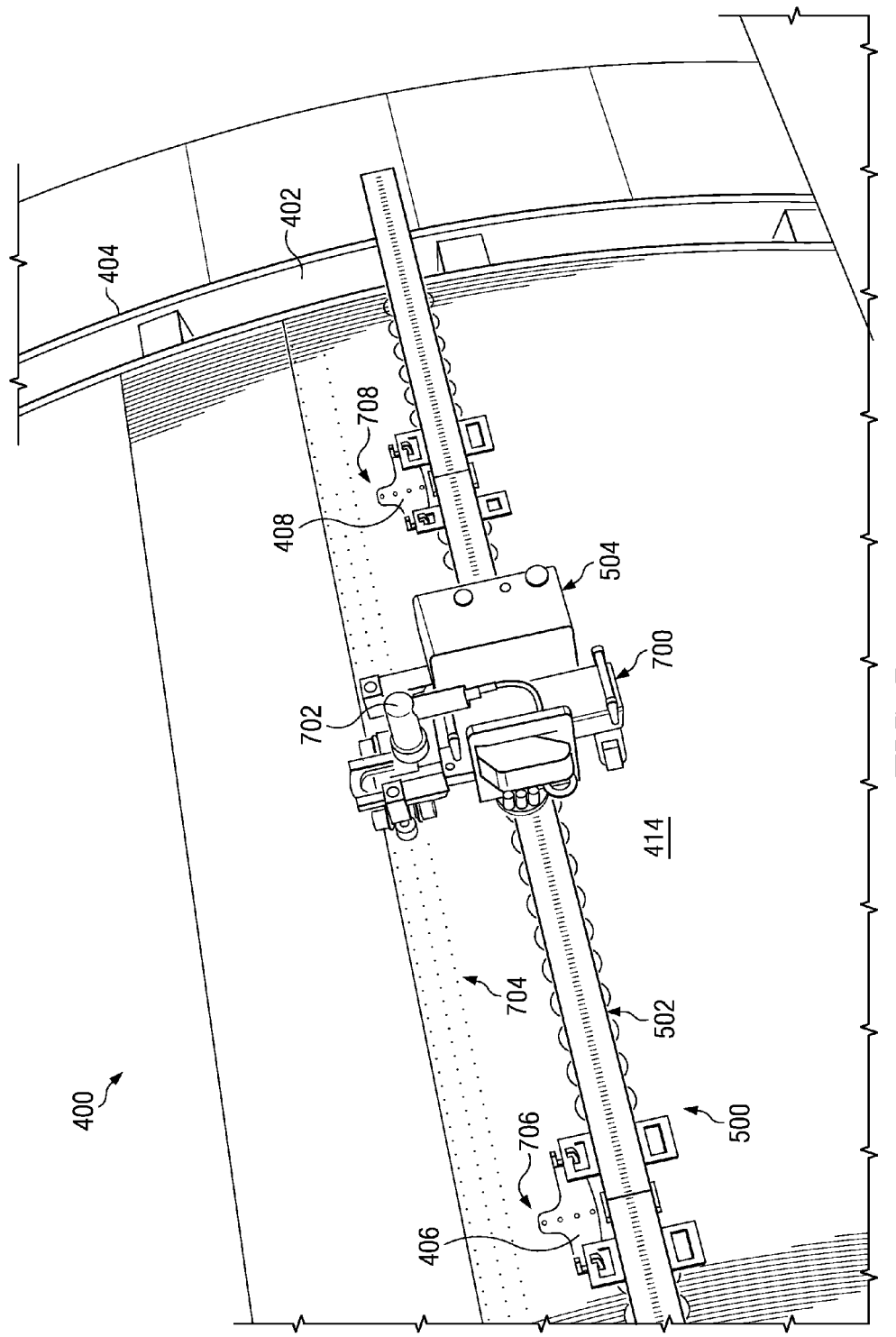
FIG. 7 is a diagram of a portion of a rivet installation environment in accordance with an advantageous environment.

With reference next to FIG. 7, a diagram of a portion of a rivet installation environment is depicted in accordance with an advantageous environment. In this view, tool module 700 may be attached to multi-axis carriage 504 in rivet installation environment 400. Further, riveting tool 702 may be mounted on tool module 700.

In this configuration, riveting tool 702 may be moved by multi-axis carriage 504 to perform riveting operations at location 704. In this view, location 706 may be identified using hanger bracket 406, and location 708 may be identified using hanger bracket 408. With identification of locations 706 and

708, multi-axis carriage 504 may move riveting tool 702 to other locations within locations 704 to perform riveting operations.

Figure 8:
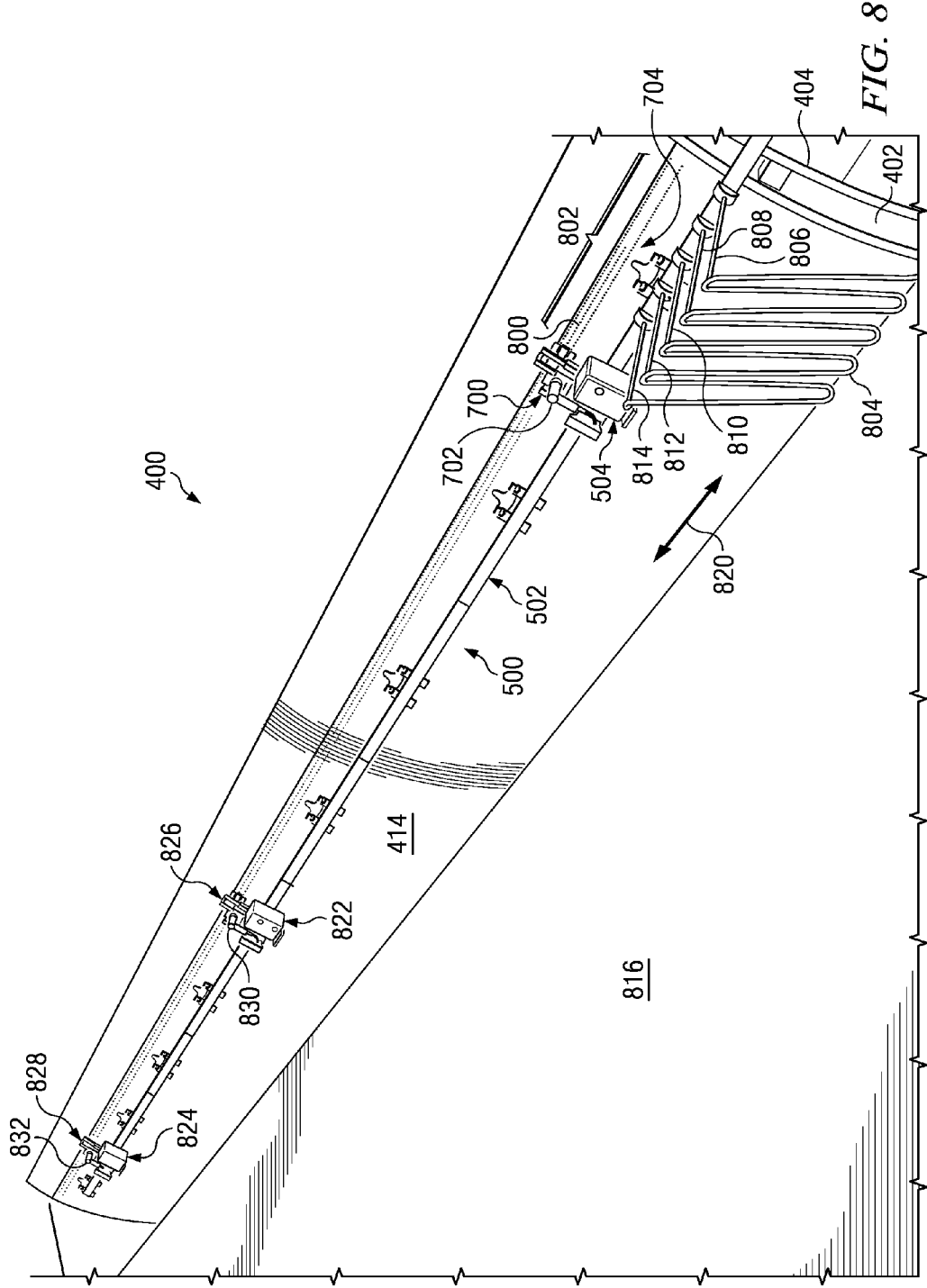
FIG. 8 is a diagram illustrating a rivet installation environment in accordance with an advantageous embodiment.

With reference now to FIG. 8, a diagram illustrating a rivet installation environment is depicted in accordance with an advantageous embodiment. In this view of rivet installation environment 400, rivets 800 have been installed in location 704 within section 802.

Umbilical cord 804 may be attached to multi-axis carriage 504 and/or tool module 700. Umbilical cord 804 may provide, for example, without limitation, electrical power, control signals, and/or pressurized air to operate multi-axis carriage 504, tool module 700, and/or riveting tool 702.

Umbilical cord 804 may be attached and/or hung on rods 806, 808, 810, 812, and 814. These rods may be attached to flexible rail 502 and may prevent umbilical cord 804 from touching floor 816 and/or surface 414 of workpiece 402. Rods 806, 808, 810, 812, and 814 may be moveable along the direction of arrow 820 to follow movement of multi-axis carriage 504 during rivet installation operations.

In this view, additional multi-axis carriages, such as multi-axis carriages 822 and 824, also may be attached to flexible rail system 500. In these examples, tool modules 826 and 828 may be attached to multi-axis carriages 822 and 824 with riveting tools 830 and 832. In this manner, rivet installation operations on locations 704 may be performed more quickly than just with riveting tool 702.

Figure 9:
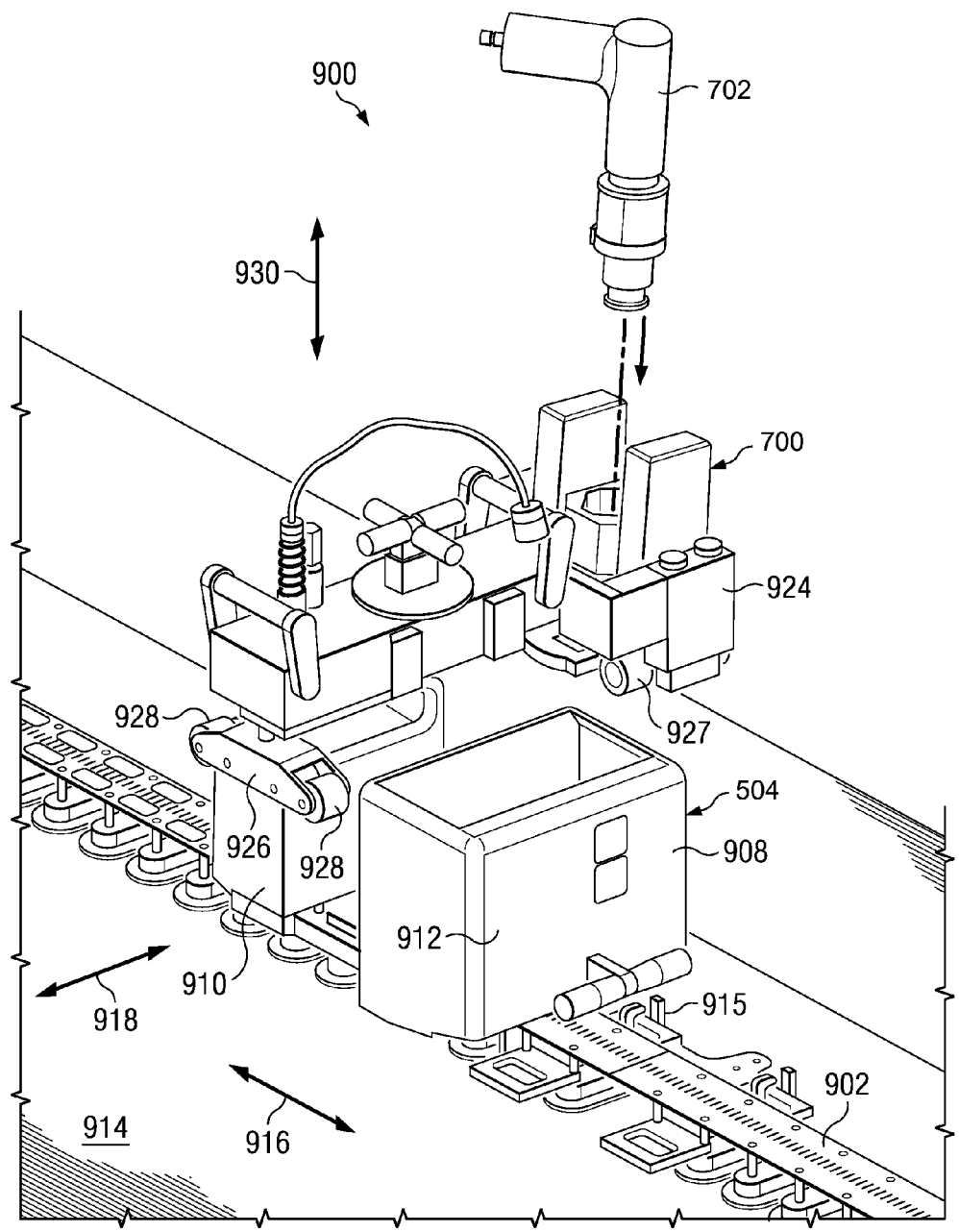
FIG. 9 is a diagram of a perspective view of a flexible rail apparatus in accordance with an advantageous embodiment.

The illustration of rivet installation environment 400 in FIGS. 4-8 and rivet installation environment 900 in FIG. 9 are only examples of some implementations for rivet installation environment 303 in FIG. 3. Of course, other implementations may have other configurations and/or numbers of multi-axis carriages, tool modules, and riveting tools.

With reference now to FIG. 9, a diagram of a perspective view of a rail apparatus may be depicted in accordance with an advantageous embodiment. In this illustrative example, rail apparatus 900 includes flexible vacuum rail 902, multi-axis carriage 504, and tool module 700. Multi-axis carriage 504 may include rail motor 908, tool module motor 910, and controller 912.

Tool module 700 may be removably coupled to multi-axis carriage 504. In these illustrative examples, flexible vacuum rail 902 may be removably attached using vacuum forces attached to surface 914. Hanging bracket 915 may provide initial support for flexible vacuum rail 902 before flexible vacuum rail 902 is activated to engage surface 914.

Multi-axis carriage 504 may move along x-axis 916, while moving along flexible vacuum rail 902. Additionally, multi-axis carriage 504 may move tool module 700 along y-axis 918 using tool module motor 910. Through this movement, riveting tool 702 may be moveable about x-axis 916 and/or y-axis 918.

Tool module 700 also may include pressure unit 924 and reaction unit 926. Pressure unit 924 has rollers 927, and reaction unit 926 has rollers 928. Pressure unit 924 is an example of an implementation of pressure unit 330 in FIG. 3. In other advantageous embodiments, pressure unit 924 and/or reaction unit 926 may use feet rather than, or in combination with, rollers 927 and rollers 928. Reaction unit 926 is an example of an implementation of reaction unit 328 in FIG. 3. Reaction unit 926 moves along z-axis 930 and may engage surface 914 after multi-axis carriage 504 moves to a location on surface 914.

The force applied by pressure unit 924 may be greater than the force applied by, riveting tool 702 as a riveting operation occurs. Reaction unit 926 may counteract the force generated by pressure unit 924 to help stabilize multi-axis carriage 504. The counter balance may be to react against any moments about flexible vacuum rail 902 that may be caused during a rivet installation operation.

Figure 10:
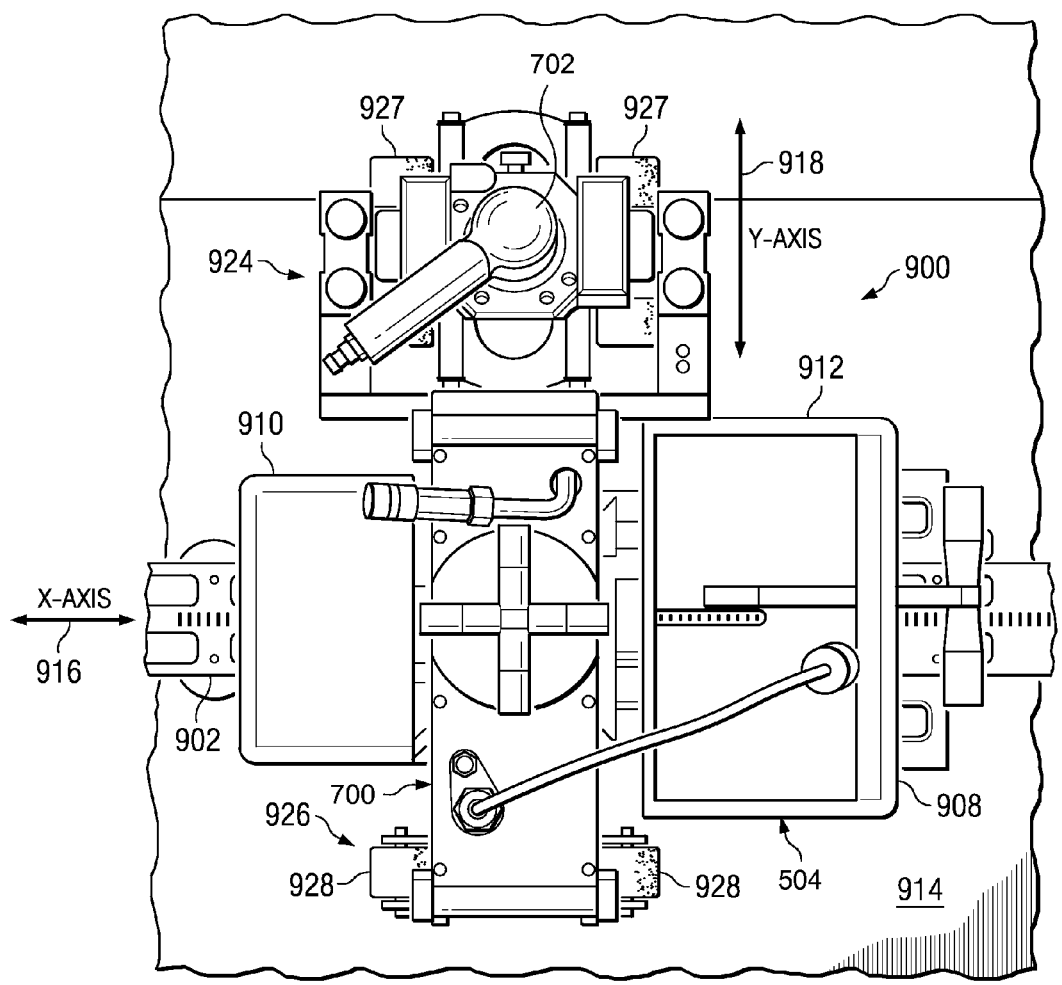
FIG. 10 is a top view of a rail apparatus in accordance with an advantageous embodiment.

Turning to FIG. 10, a top view of rail apparatus 900 is depicted in accordance with an advantageous embodiment. In this view of rail apparatus 900, tool module 700 may be coupled to multi-axis carriage 504. Riveting tool 702 may be mounted onto tool module 700.

Figure 11:
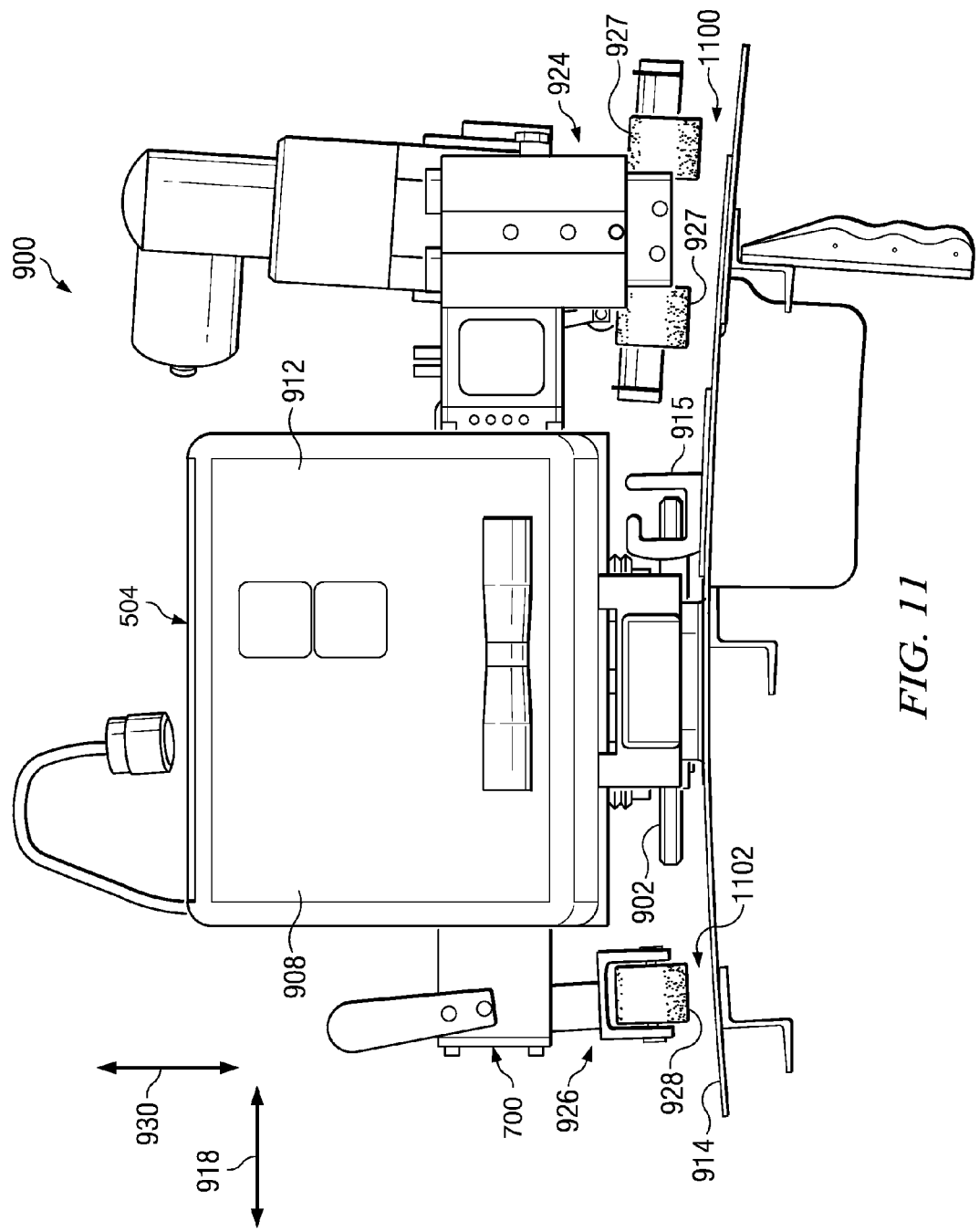
FIG. 11 is a back view of a rail apparatus in accordance with an advantageous embodiment.

With reference now to FIG. 11, a back view of rail apparatus 900 is depicted in accordance with an advantageous embodiment. In this view of rail apparatus 900, rollers 927 for pressure unit 924 and rollers 928 for reaction unit 926 may not be in contact with surface 914. In this example, gap 1100 may be present between rollers 927 and surface 914. Gap 1102 may be present between rollers 928 and surface 914.

Figure 12:
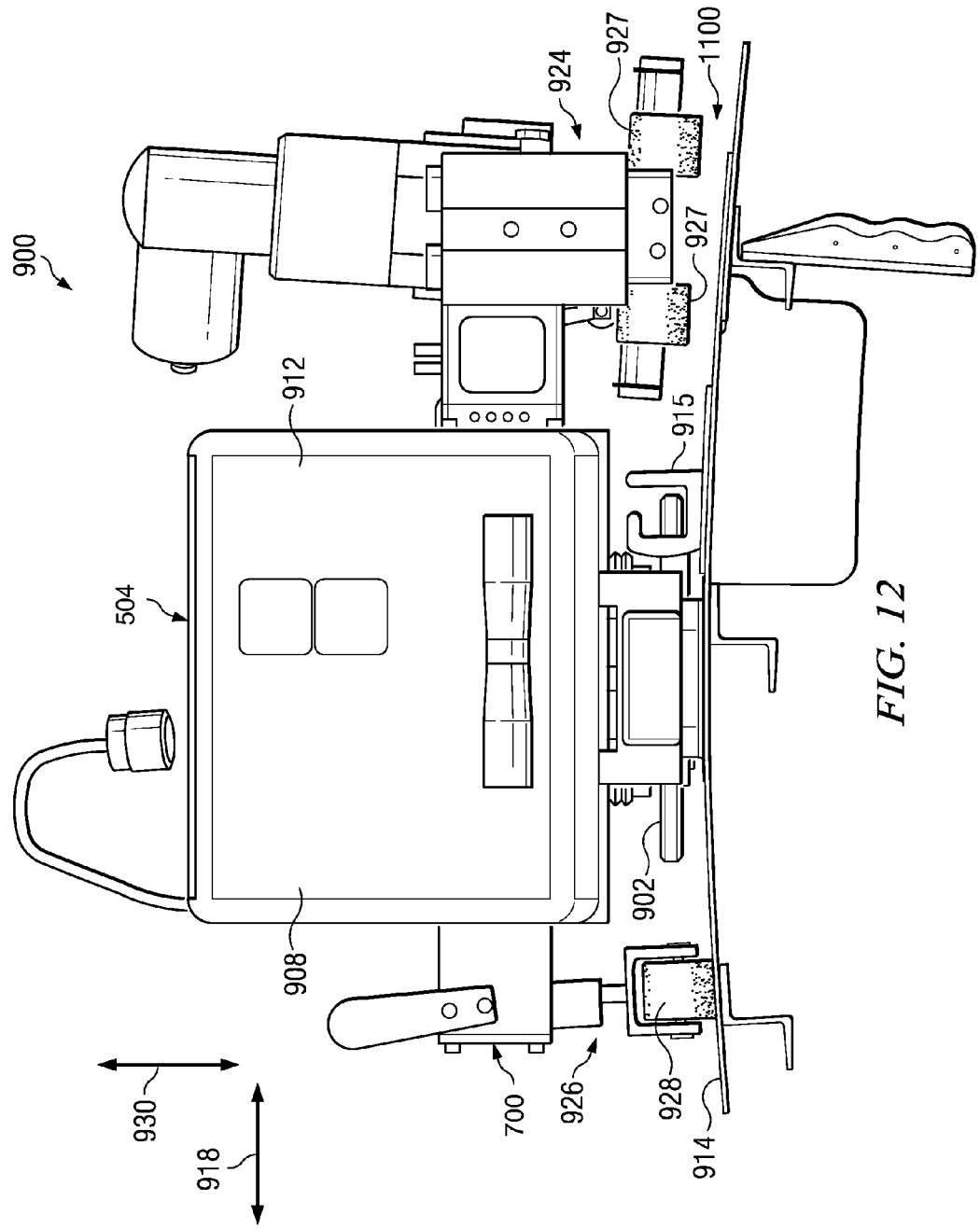
FIG. 12 is a diagram illustrating the lowering of a reaction unit in accordance with an advantageous embodiment.

With reference to FIG. 12, a diagram illustrating the lowering of reaction unit 900 is depicted in accordance with an advantageous embodiment. In this example, rollers 928 for reaction unit 926 may be lowered onto surface 914. Further, reaction unit 926 may be locked into place. Reaction unit 926 may impart a small force on surface 914.

Figure 13:
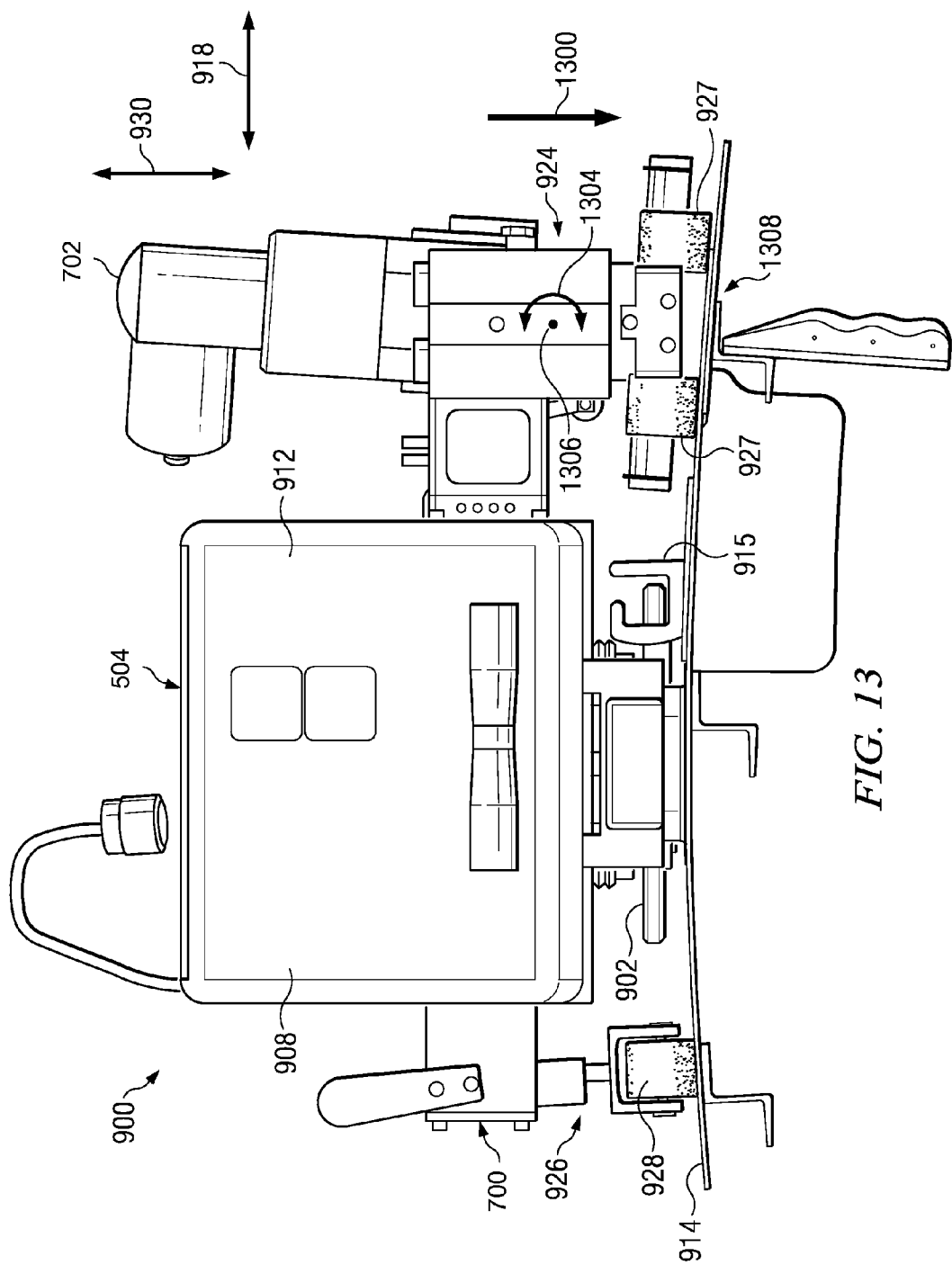
FIG. 13 is a diagram illustrating the lowering of a pressure unit onto a surface in accordance with an advantageous embodiment.

In FIG. 13, a diagram illustrating lowering of a pressure unit onto a surface is depicted in accordance with an advantageous embodiment. In this view, rollers 927 from pressure unit 924 may be lowered to contact surface 914. Further, force 1300 may be applied by pressure unit 924 onto surface 914. Force 1300 may be, for example, without limitation, around one to around 500 pounds or more, depending on the particular implementation. Rollers 927 for pressure unit 924 and rollers 928 for reaction unit 926 may remain in contact with surface 914 as rail apparatus 900 moves and performs riveting operations.

Further, as can be seen in this example, pressure unit 924 may rotate in the direction of arrow 1304 about a-axis 1306 to maintain z-axis 930 for riveting tool 702 in a direction that is around normal to surface 914 at location 1308 for a particular riveting operation on a contoured surface.

Tool module 700 may move riveting tool 702 along axis 930. Riveting tool 702 may be moved away from surface 914 when a riveting operation is finished and/or not in progress. Riveting tool 702 may be moved towards surface 914 when a riveting operation is to be performed.

Figure 14:
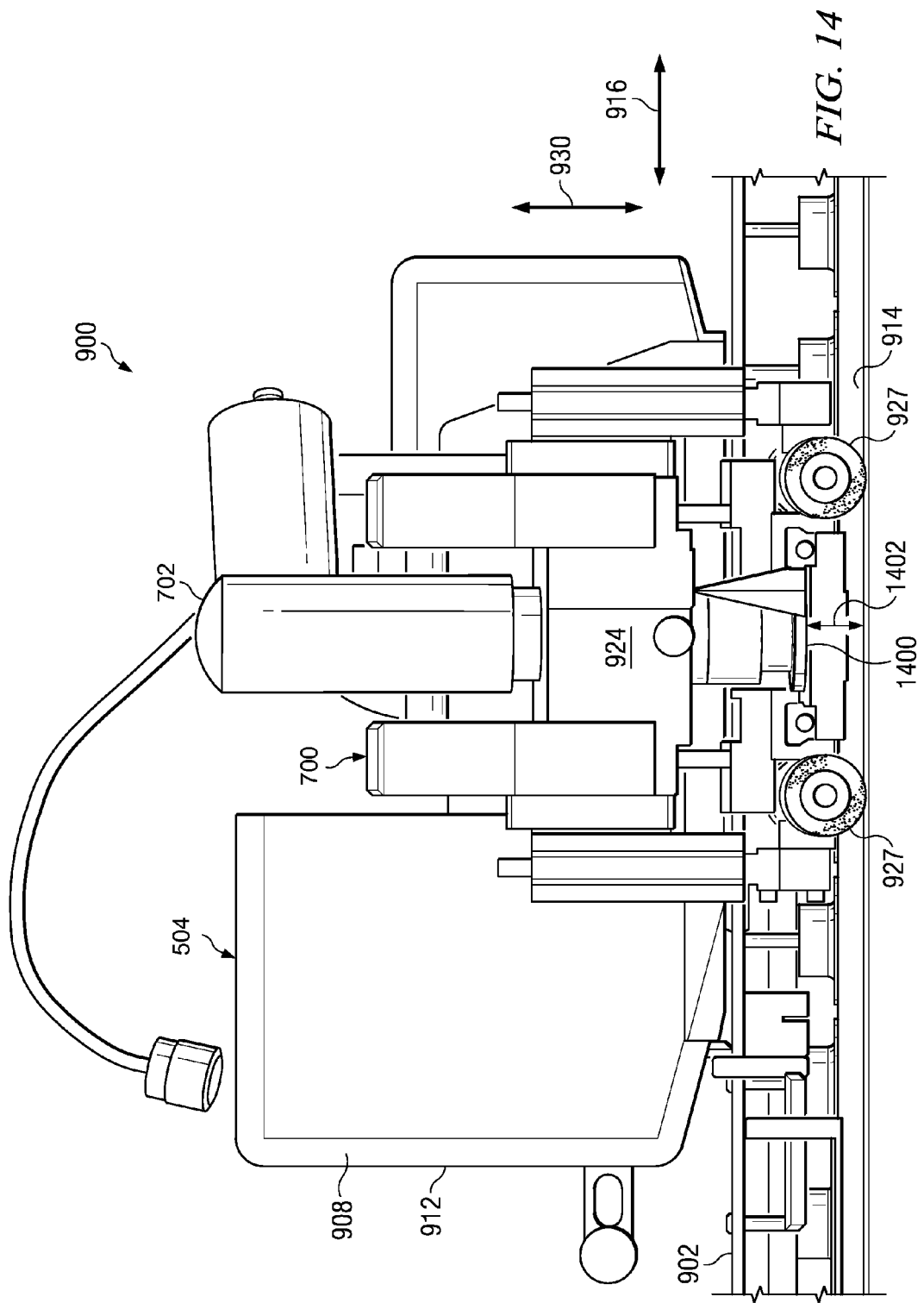
FIG. 14 is a diagram of a side view of a flexible rail apparatus in accordance with an advantageous embodiment.

With reference to FIG. 14, a diagram of a side view of a rail apparatus is depicted in accordance with an advantageous embodiment. In this view, end 1400 may have distance 1402 above surface 914.

Figure 15:
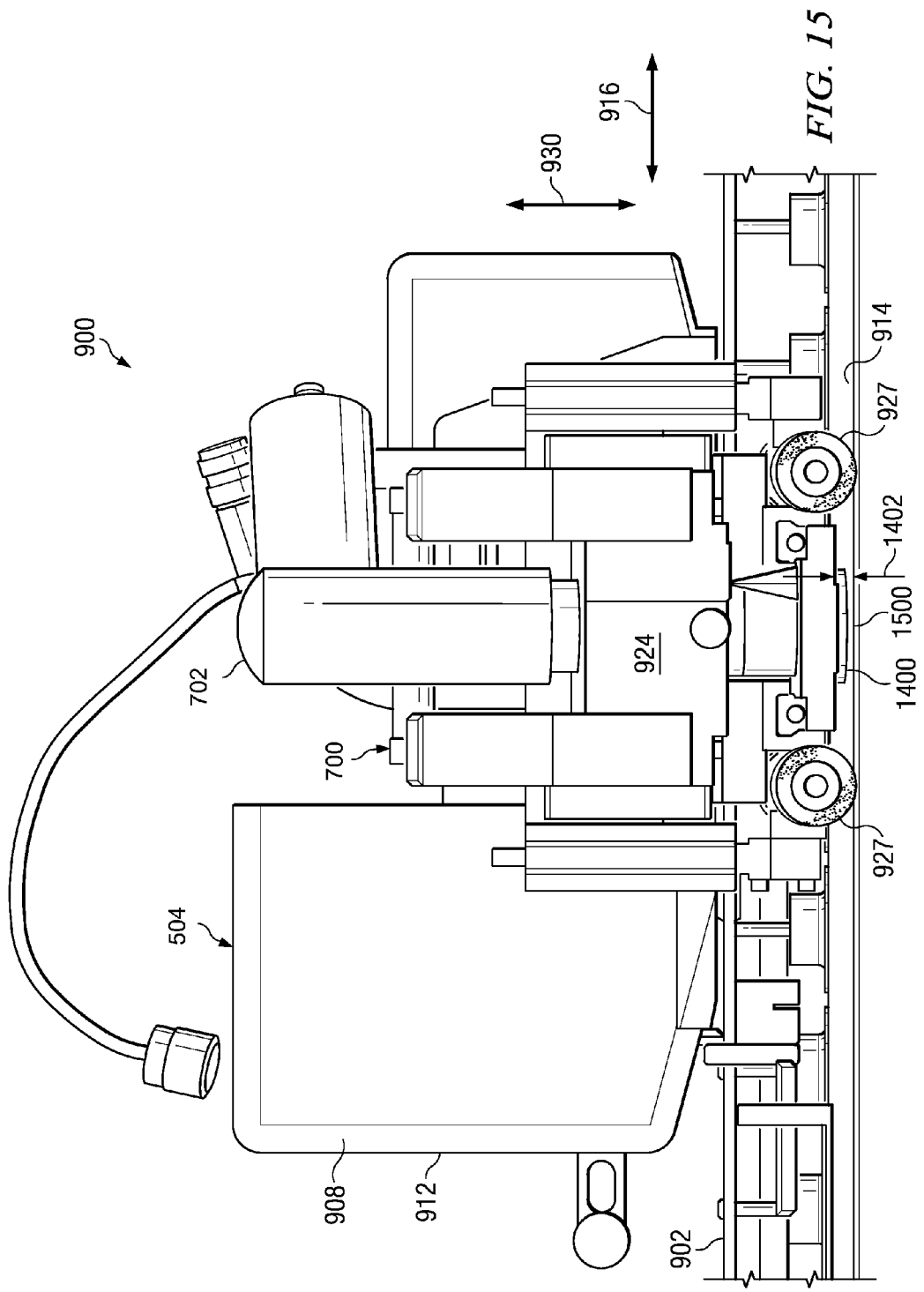
FIG. 15 is a diagram illustrating a side view of a flexible rail apparatus in accordance with an advantageous embodiment.

With reference now to FIG. 15, a diagram illustrating a side view of a rail apparatus is depicted in accordance with an advantageous embodiment. In this side view of rail apparatus 900, end 1400 of riveting tool 702 may be in contact with surface 914 at point 1500 to perform a riveting operation.

Figure 16:
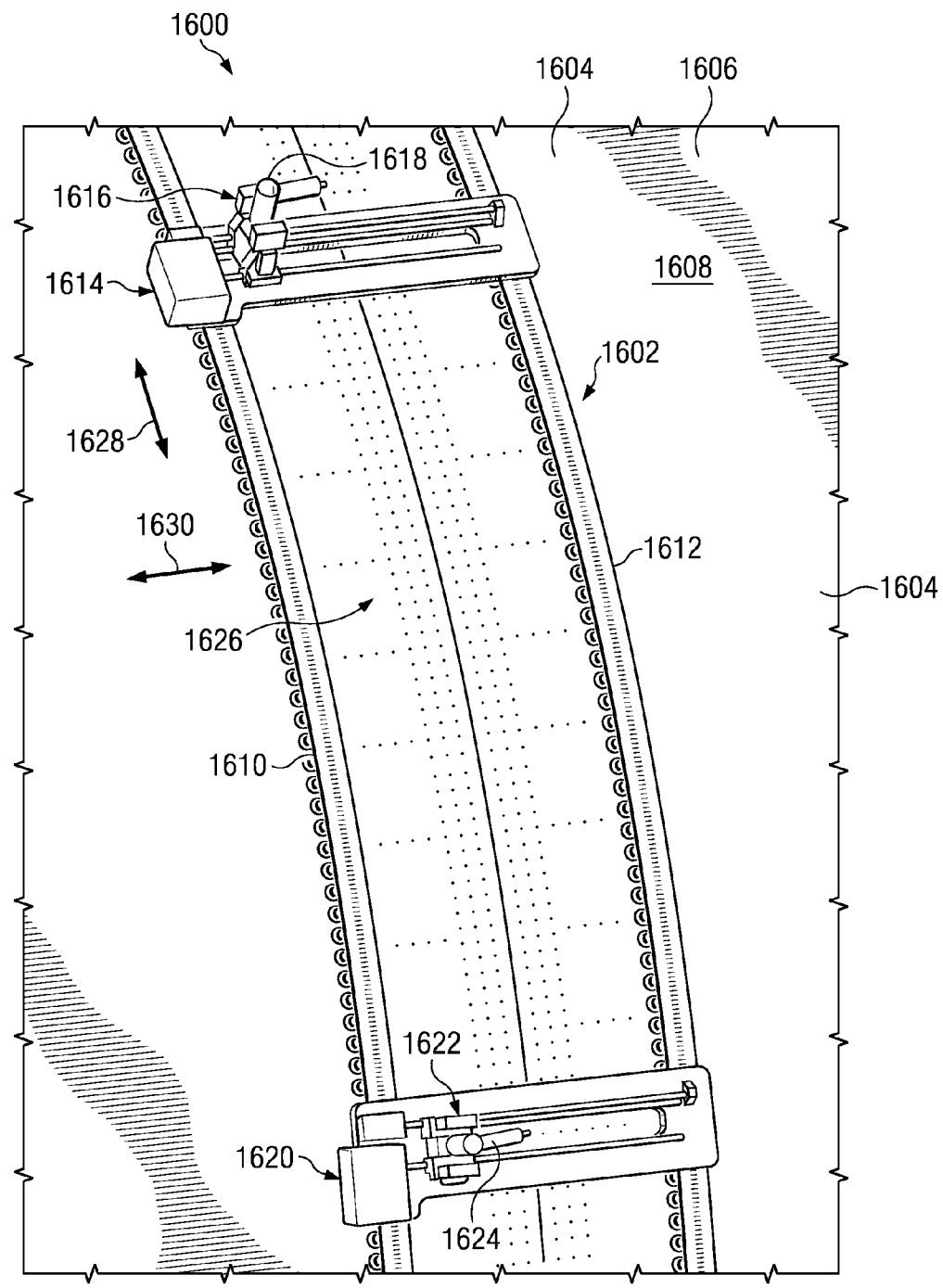
FIG. 16 is a diagram of another implementation of a rivet installation environment in accordance with an advantageous embodiment.

With reference now to FIG. 16, a diagram of another implementation of a rivet installation environment is depicted in accordance with an advantageous embodiment. In this example, rivet installation environment 1600 has flexible rail system 1602 mounted circumferentially on surface 1604 of workpiece 1606. In this example, workpiece 1606 may be airframe 1608.

Flexible rail system 1602, in this implementation, may have flexible rail 1610 and flexible rail 1612. Multi-axis carriage 1614 may travel on flexible rail system 1602. Tool module 1616 may be attached to multi-axis carriage 1614. Riveting tool 1618 may be mounted on tool module 1616. In this example, multi-axis carriage 1620 also may be attached to flexible rail system 1602. Tool module 1622 may be attached to multi-axis carriage 1620. Riveting tool 1624 may be attached to tool module 1622. In this manner, riveting operations may be performed at locations 1626 of workpiece 1606.

In this example, multi-axis carriage 1614 and multi-axis carriage 1620 may move riveting tool 1618 and riveting tool 1624 in the direction of arrow 1630 and the direction of arrow 1628. Arrow 1628 may correspond to an x-axis, while arrow 1630 may correspond to a y-axis. This movement of riveting tools 1618 and 1624 may be performed to position these tools at locations 1626 to perform various rivet installation operations.

Figure 17:
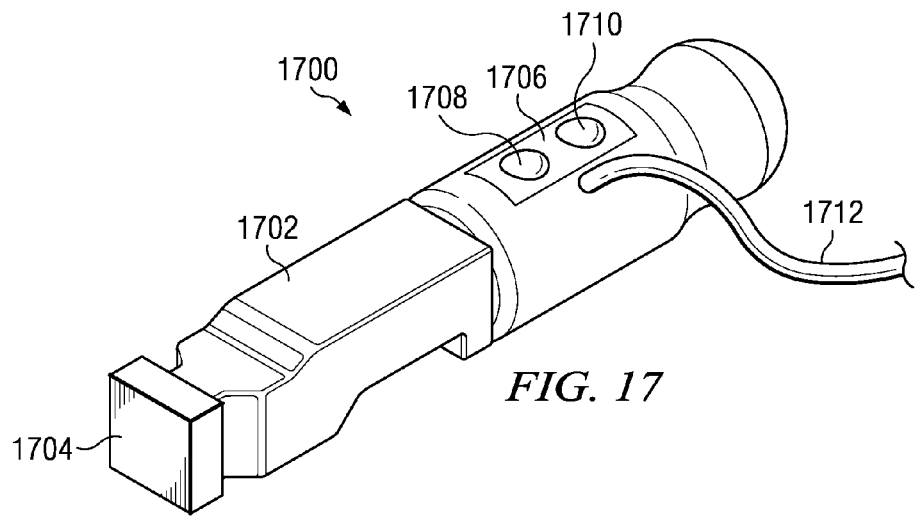
FIG. 17 is a diagram illustrating a backing unit in accordance with an advantageous embodiment.

In FIG. 17, a diagram illustrating a backing unit is depicted in accordance with an advantageous embodiment. In this example, backing unit 1700 is an example of one implementation for backing unit 366 in FIG. 3.

Backing unit 1700 takes the form of bucking bar 1702. As can be seen in this example, surface 1704 may contact a rivet being secured into structure 302 by riveting tool 362 in FIG. 3. Backing unit 1700 also may include trigger system 1706, which may have button 1708 and button 1710. Button 1708 may be activated when an operator wishes to generate a signal indicating that backing unit 1700 is ready for a rivet installation operation. Button 1710 may be activated to move riveting tool 362 to a previous position. Cable 1712 provides communications link 377 to controller 323 in multi-axis carriage 306.

Of course, the illustration of backing unit 1700 is presented for purposes of illustrating one manner in which backing unit 366 may be implemented. Of course, in other implementations, backing unit 366 may take other forms, shapes, and/or sizes. Also, backing unit 1700 may include other features or some features illustrated in this example.

Figure 18:
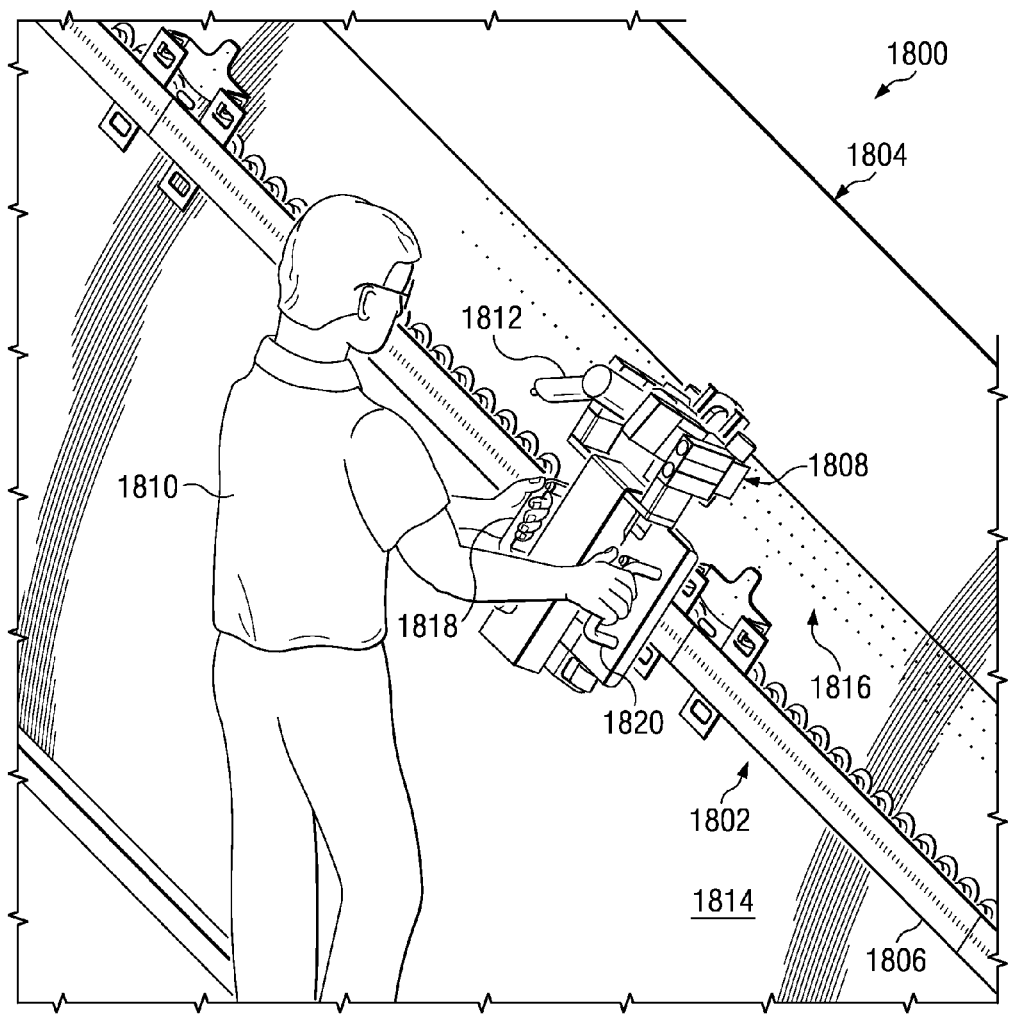
FIG. 18 is a diagram illustrating a rivet installation environment in accordance with an advantageous embodiment.

With reference now to FIG. 18, a diagram illustrating a rivet installation environment is depicted in accordance with an advantageous embodiment. In installation environment 1800, rail apparatus 1802 may be installed on structure 1804, and multi-axis carriage 1808 may be attached to rail apparatus 1802.

In this example, multi-axis carriage 1808 may not require motors, such as rail motor 320 and tool module motor 322 in FIG. 3, for operation. Instead, operator 1810 may move riveting tool 1812 relative to surface 1814 of structure 1804 over locations 1816 to perform riveting operations. In this illustrative example, operator 1810 may move multi-axis carriage 1808 using handle 1818 and handle 1820. In yet other advantageous embodiments, multi-axis carriage 1808 may include motors like rail motor 320 and tool module motor 322 from FIG. 3 that may move riveting tool 1812 over locations 1816 to perform riveting operations under the control of operator 1810.

In this manner, operator 1810 may move and control riveting tool 1812. Operator 1810 may be separated or further removed from vibrations that may be generated by riveting tool 1812.

Figure 19:
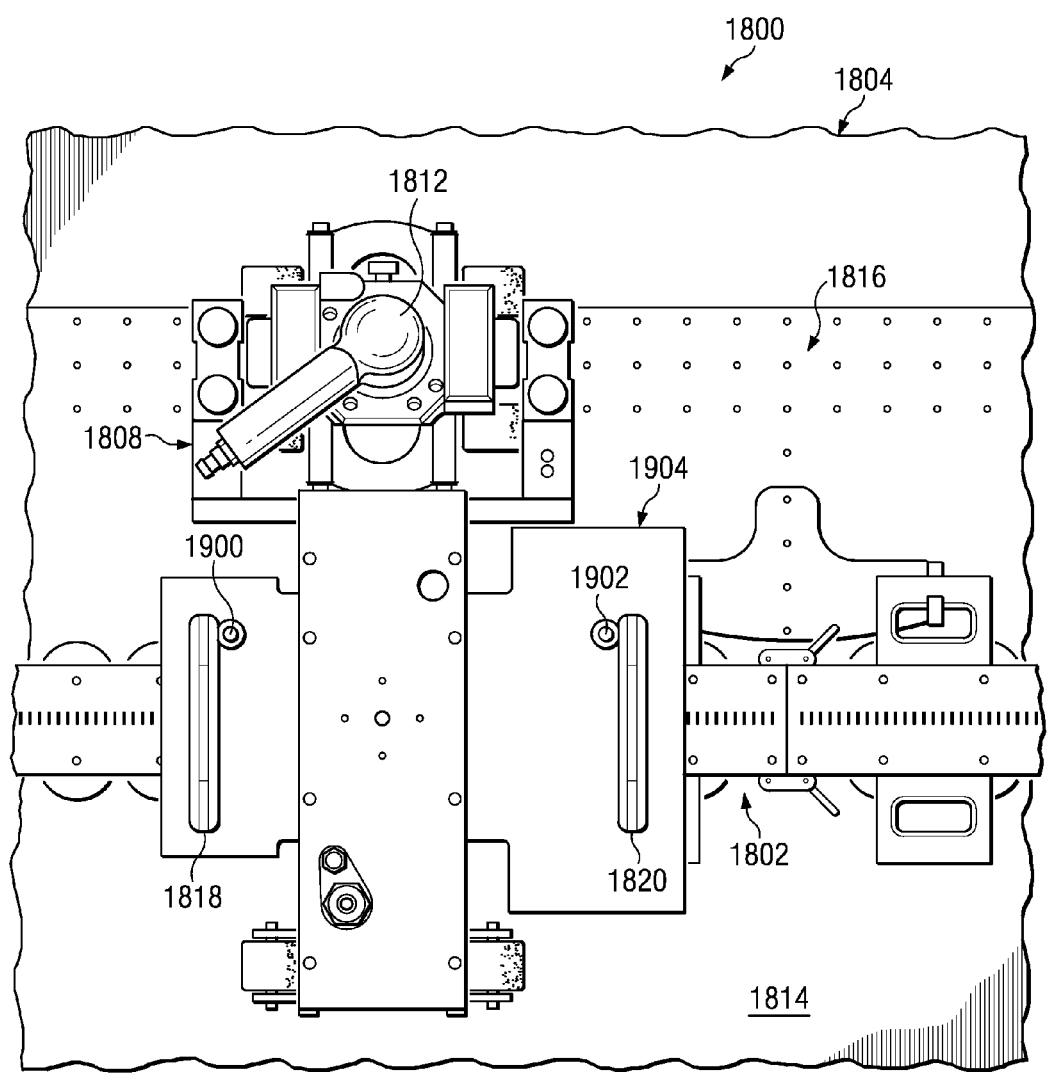
FIG. 19 is a top view of a rivet installation environment in accordance with an advantageous embodiment.

With reference now to FIG. 19, a top view of a rivet installation environment is depicted in accordance with an advantageous embodiment. In this example, handle 1818 may have button 1900, and handle 1820 may have button 1902. Button 1900 and button 1902 may be part of trigger system 1904, which may be used to clamp up over a rivet and control riveting tool 1812 to perform riveting operations.

Figure 20:
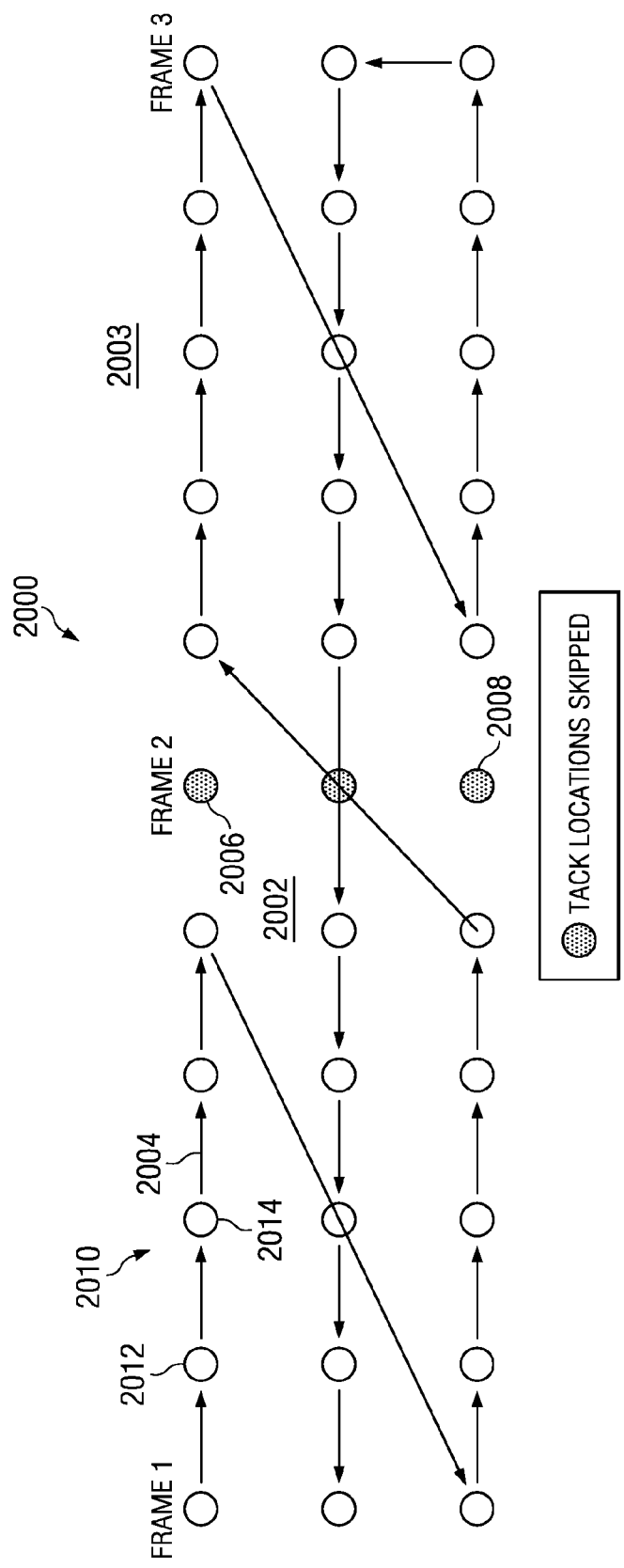
FIG. 20 is a diagram illustrating locations for fasteners in accordance with an advantageous embodiment.

With reference now to FIG. 20, a diagram illustrating locations for fasteners is depicted in accordance with an advantageous embodiment. Locations 2000 form pattern of locations 2002 for installation of rivets in part 2003.

In the different advantageous embodiments, the installation of rivets may follow path 2004. Path 2004 may provide a preselected sequence for locations 2000. This sequence may reduce and/or eliminate confusion for an operator of backing unit 366 as to where rail apparatus 300 may move on path 2004. In these examples, tack fastener locations 2006 and 2008 may be skipped. Tack fastener locations 2006 and 2008 may be locations that provide a capability to clamp or hold parts to each other while rivets are installed.

In these examples, tack fastener locations 2006 and 2008 may be pre-existing coordination holes in part 2003. Locations 2000 may already have holes 2010. In other advantageous embodiments, a hole, such as hole 2012, may be drilled prior to installing a fastener in hole 2012. The process may then drill hole 2014 and install a fastener in hole 2014.

Figure 21:
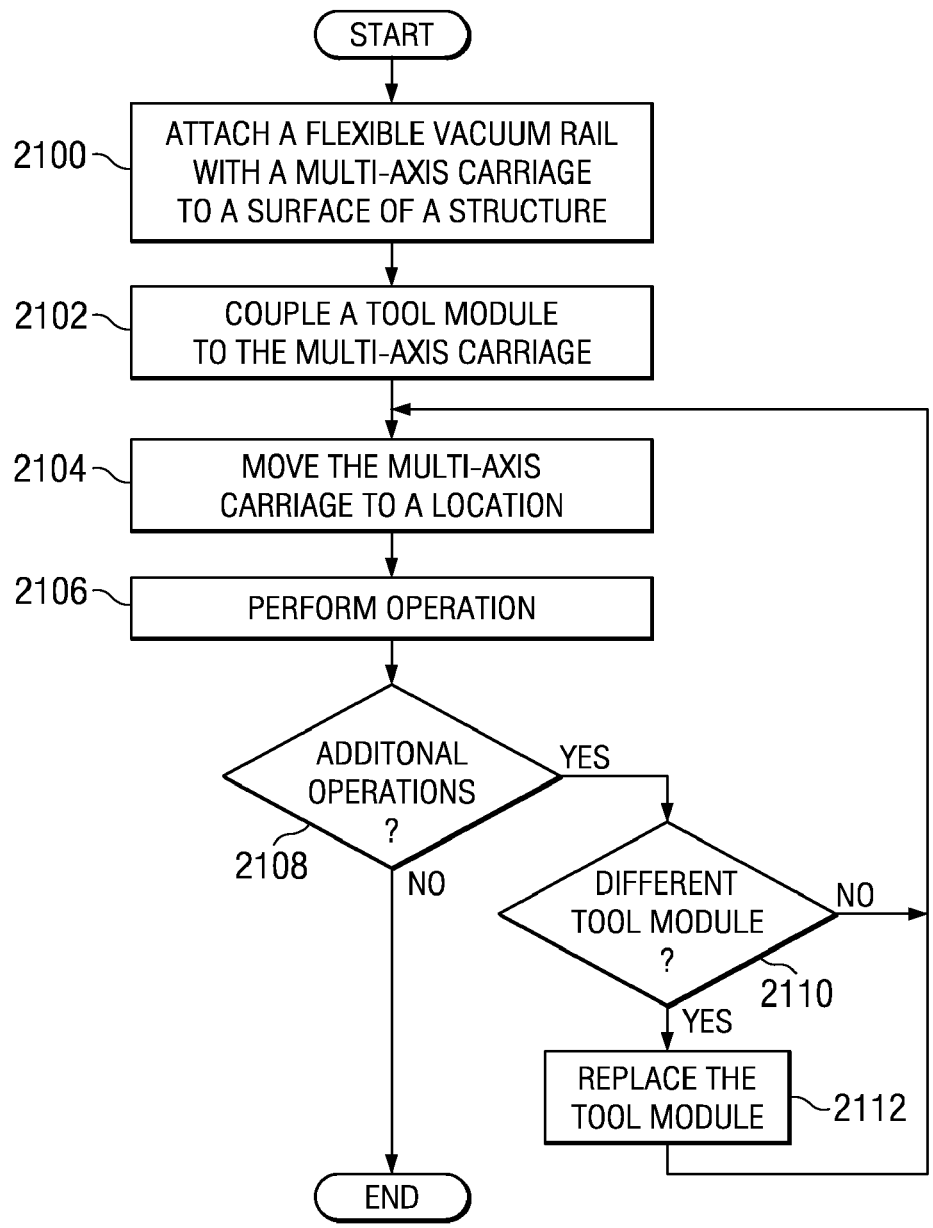
FIG. 21 is a flowchart of a process for performing an operation on a workpiece in accordance with an advantageous embodiment.

With reference now to FIG. 21, a flowchart of a process for performing an operation on a workpiece is depicted in accordance with an advantageous embodiment. The process illustrated in FIG. 21 may be implemented using a rail apparatus such as, for example, without limitation, rail apparatus 300 in FIG. 3.

The process may begin by attaching flexible vacuum rail 902 in FIG. 9, with multi-axis carriage 504 coupled to flexible vacuum rail 902, to first surface 310 of structure 302 in FIG. 3 (operation 2100). The process may also begin by attaching the flexible vacuum rail to the surface of the workpiece and subsequently attaching the multi-axis carriage to the flexible vacuum rail. The process then may couple tool module 700 to multi-axis carriage 504 (operation 2102). The process may then move multi-axis carriage 504 to a location (operation 2104).

An operation may be performed at the location (operation 2106). This operation may be, for example, without limitation, a drilling operation, a sealing operation, a fastening operation, a measuring operation, and/or some other suitable operation. When operation 2106 is a riveting operation, operation 2106 may also involve moving and/or placing backing unit 366 at the location at which multi-axis carriage 504 is located. In these advantageous embodiments, coordination between the movement between multi-axis carriage 504 and a movement of backing unit 366 may be performed by an operator knowing the preselected number of locations and/or pattern of locations for the riveting operations.

The operator may move backing unit 366 to the location prior to multi-axis carriage 504 moving to the location. In other advantageous embodiments, the operator may move backing unit 366 to the location after multi-axis carriage 504 has moved to the location. In these examples, movement of multi-axis carriage 504 and/or performance of the riveting operation may be initiated by the operator of backing unit 366 through trigger system 374 in performing operation 2108.

Operation 2108 may only involve performing riveting. In other advantageous embodiments, if tool module 700 has multiple tools, multiple operations may be performed at the location. For example, without limitation, in some advantageous embodiments, a hole may be drilled at the location, sealant may be applied, and then a rivet may be installed with backing unit 366 being present at the location for the riveting operation. A determination may then be made as to whether additional operations are to be performed (operation 2108).

If additional operations are to be performed, a determination may be made as to whether a different tool module may be needed (operation 2110). If a different tool module is needed, the process may replace the current tool module with another tool module (operation 2112), with the process then returning to operation 2104. If a different tool module is not needed, the process may then proceed directly to operation 2104 as described above. With reference again to operation 2108, if more operations are not needed, the process then terminates.

The illustration of the operations in FIG. 21 is not meant to limit the manner in which operations may be performed on a workpiece. Other operations may be performed in addition to, or in place of, the operations illustrated. Also, operations illustrated in the process in FIG. 21 may be performed in different orders depending on the particular implementation. In some advantageous embodiments, operation 2102 may be performed prior to operation 2100.

As another non-limiting example, multi-axis carriage 504 may be attached to flexible vacuum rail 902 after flexible vacuum rail 902 has been attached to the work surface. The tool may be a standard handheld tool capable of independent operator use, in which tool module 308 is designed to be capable of receiving standard currently used tools. In other advantageous embodiments, specially made tools may be designed and manufactured for tool module 308.

Figure 22:
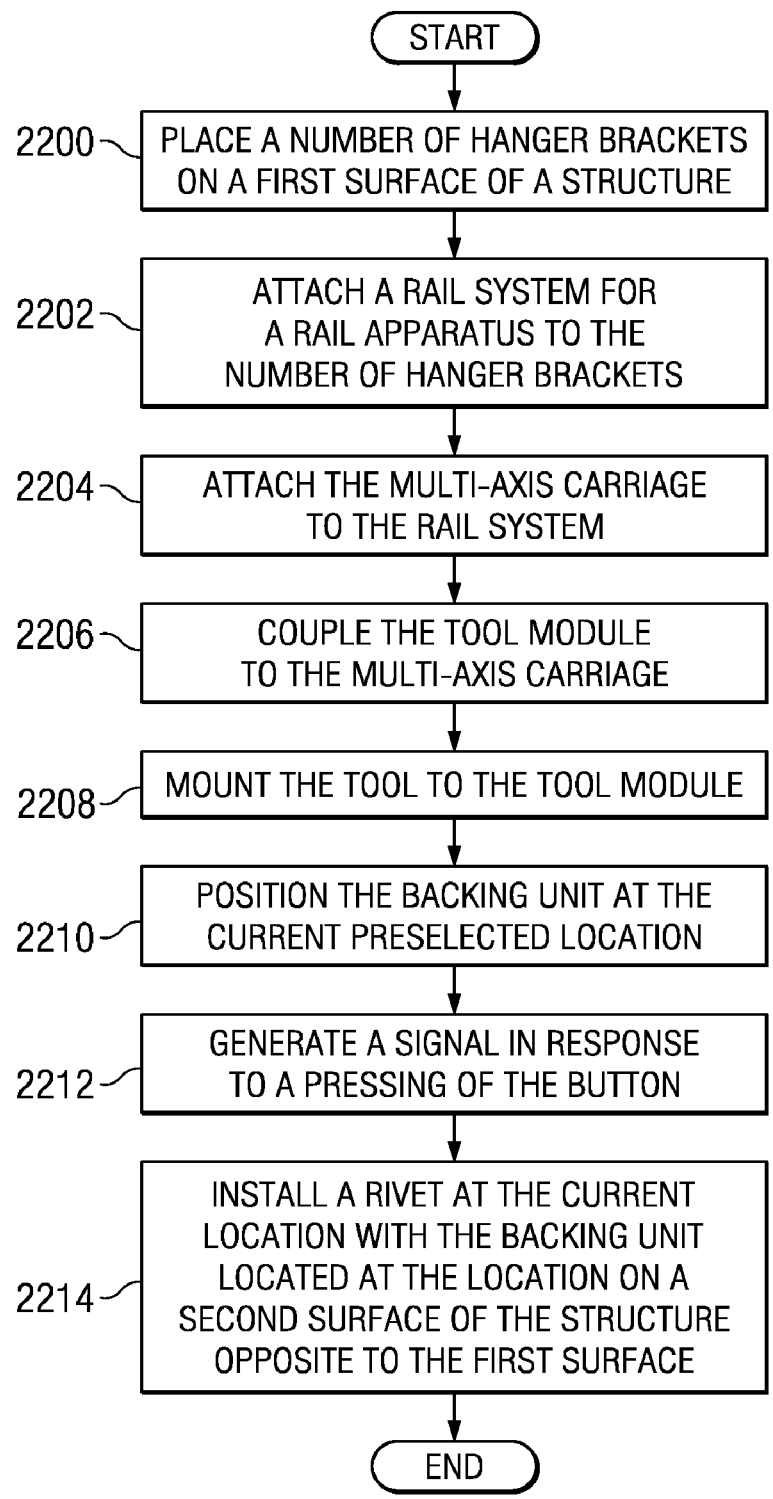
FIG. 22 is a flowchart of a process for performing riveting operations in accordance with an advantageous embodiment.

With reference now to FIG. 22, a flowchart of a process for performing riveting operations is depicted in accordance with an advantageous embodiment. The process illustrated in FIG. 22 may be implemented in a rivet installation environment such as, for example, without limitation, rivet installation environment 303 in FIG. 3.

The process begins by placing a number of hanger brackets 406 and 408 on a first surface 310 of structure 302 (operation 2200). The process then attaches rail system 304 for rail apparatus 300 to the number of hanger brackets 406 and 408 (operation 2202). The flexible rail apparatus may also comprise multi-axis carriage 306 coupled to the flexible rail system wherein multi-axis carriage 306 is capable of moving along rail system 304.

Multi-axis carriage 306 may be capable of moving a riveting tool in axes relative to first surface 310. Tool module 308 also may be present in rail apparatus 300 and may be removably coupled to multi-axis carriage 306. Tool module 308 may comprise frame 324 and may be capable of receiving riveting tool 362.

Further, controller 323 may be present in rail apparatus 300 and may be capable of controlling movement of riveting tool 362 to a number of preselected locations 384 on surface 310 of structure 302. Controller 323 also may be capable of causing riveting tool 362 to install a number of rivets in a number of preselected locations 384 in response to signal 376.

Multi-axis carriage 306 may be attached to rail system 304 (operation 2204). Tool module 308 may be coupled to multi-axis carriage 306 (operation 2206). The tool may then be mounted to tool module 308 (operation 2008).

Backing unit 366 may then be positioned at the current preselected location (operation 2210). Signal 376 may then be generated in response to a pressing of button 380 (operation 2212). Riveting tool 362 mounted to rail apparatus 300 on first surface 310 of the structure may be moved to a preselected location within a number of preselected locations 384 on first surface 310 of structure 302 in response to signal 376 to form a current preselected location. A rivet may be installed at the current location with backing unit 366 located at the location on second surface 368 of structure 302 opposite to the first surface (operation 2214).

In this manner, the number of operators needed to perform a riveting operation may be reduced from two operators to a single operator. A single operator may operate backing unit 366 and multi-axis carriage 306. As a result, the second operator handling a riveting tool with the associated vibrations and noises may be reduced and/or eliminated because that operator is no longer needed. The operator of the backing tool, however, may still manually operate backing unit 366.

In still other advantageous embodiments, backing unit 366 may also be mounted to a rail apparatus similar to rail apparatus 300. With this type of implementation, an operator no longer needs to manually handle backing unit 366. This type of implementation further reduces the issues associated with noise and vibration that an operator may be exposed to. By having an operator handle backing unit 366, communication problems and/or coordination problems associated with one operator operating riveting tool 362 and another operator handling backing unit 366 may be reduced.

In this type of operation, the operator operating backing unit 366 may indicate when movement of riveting tool 362 should occur and/or when riveting operations should be performed using riveting tool 362. The operations illustrated in FIG. 22 may be repeated for any number of rivets that may be installed.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code and/or operation performed by a device.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. For example, without limitation, the riveting tool may be already mounted to the tool module before the tool module is coupled to the carriage.

Thus, the different advantageous embodiments provide a method and apparatus for installing rivets on a structure. The flexible rail system is capable of being attached to a surface of a structure. A multi-axis carriage may be coupled to the flexible rail system. The multi-axis carriage may be capable of moving along a flexible rail system and may be capable of moving a riveting tool in axes relative to the surface.

A tool module may be capable of being removably coupled to the multi-axis carriage. The tool module has a frame and may be capable of receiving the riveting tool. The controller may be capable of controlling movement of the riveting tool to a number of preselected locations on the surface of the structure and may be capable of causing the riveting tool to install a number of rivets in a number of preselected locations in response to a signal.

The different advantageous embodiments may allow installation of rivets on a structure with less than two operators. In some advantageous embodiments, a flexible rail apparatus may be located on one side of the structure, and an operator may be located on another side of the structure with a bucking unit. In yet other advantageous embodiments, no human operators may be needed. The bucking unit may be moved using a robotic arm and/or another flexible rail apparatus.

In this manner, installation of rivets may be performed more quickly as compared to current operations in which two operators may be required. Further, in yet other advantageous embodiments, multiple flexible rail apparatuses may be present on the structure. With multiple flexible rail apparatuses, the time needed to install rivets may be further reduced.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a rail system configured to attach to a surface on a structure;
   a multi-axis carriage coupled to the rail system, wherein the multi-axis carriage is configured to move along the rail system and configured to move a riveting tool in axes relative to the surface;
   a tool module configured to be removably coupled to the multi-axis carriage, wherein the tool module comprises a frame and is configured to receive the riveting tool;
   a controller configured to control movement of the riveting tool to a number of preselected locations on the surface of the structure and configured to cause the riveting tool to install a number of rivets in the number of preselected locations in response to a signal; and
   a backing unit, configured to communicate with the controller, comprising a signal generator configured to generate at least one of: the signal, and a second signal to cause the multi-axis carriage to move to a next location in the number of preselected locations.

2. The apparatus of claim 1 further comprising:
   the riveting tool configured to mount to the tool module.

3. The apparatus of claim 1,
   such that the signal generator is further configured to generate a third signal to cause the multi-axis carriage to move to a previous location in the number of preselected locations.

4. The apparatus of claim 1, wherein the backing unit is a bucking bar.

5. The apparatus of claim 1, wherein the rail system comprises a rail, and wherein the tool module further comprises:
   a pressure unit located on a first side of the tool module and configured to apply pressure to the surface; and
   a reaction unit located on a second side of the tool module and configured to stabilize the multi-axis carriage during operation of the tool module.

6. The apparatus of claim 5, wherein the reaction unit is configured to stabilize the multi-axis carriage while the multi-axis carriage moves along the rail system.

7. The apparatus of claim 6, wherein the reaction unit comprises:
   a number of rollers.

8. The apparatus of claim 1, wherein the rail system comprises:
   a plurality of rails.

9. The apparatus of claim 1, wherein the riveting tool is selected from one of a pneumatic rivet gun and a hydraulic rivet gun.

10. The apparatus of claim 1 further comprising:
    a drill configured to attach to the tool module with the riveting tool.

11. The apparatus of claim 1, wherein the surface is for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a pressure vessel, and a building.

12. An apparatus comprising:
    a rail system configured to attach to a surface, wherein the rail system comprises a flexible rail or a plurality of flexible rails;
    a multi-axis carriage coupled to the rail system, wherein the multi-axis carriage is configured to move along the rail system and is configured to move a riveting tool in axes relative to the surface;
    a tool module capable of being removably coupled to the multi-axis carriage, wherein the tool module comprises a frame and is configured to receive the riveting tool;
    the riveting tool configured to mount to the tool module, wherein the riveting tool is selected from one of a pneumatic rivet gun and a hydraulic rivet gun;
    a controller configured to control movement of the riveting tool to a number of preselected locations on the surface of a structure and configured to install a number of rivets in the number of preselected locations in response to a signal;
    a bucking bar configured to communicate with the controller and configured to generate the signal;
    a trigger system located on the bucking bar, wherein the trigger system has a first button and a second button configured to initiate generation of the signal in response to a manipulation by an operator, wherein the first button is configured to generate the signal to cause the multi-axis carriage to move to a next location in the number of preselected locations and wherein the second button is configured to generate the signal to cause the multi-axis carriage to move to a previous location in the number of preselected locations;
    a pressure unit having a number of rollers, wherein the pressure unit is located on a first side of the tool module and configured to apply pressure to the surface; and
    a reaction unit having a number of rollers, wherein the reaction unit is located on a second side of the tool module and configured to stabilize the multi-axis carriage during operation of the tool module and wherein the reaction unit is configured to stabilize the multi-axis carriage while the multi-axis carriage moves along the rail system, wherein the surface is for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a pressure vessel, and a building.

13. A method for performing riveting operations on a structure, the method comprising:
    moving, using a controller configured to control movement of the riveting tool to a number of preselected locations on the surface of the structure in response to a signal, a riveting tool mounted to a rail apparatus on a first surface of the structure to a preselected location within the number of preselected locations on the first surface of the structure, to form a current preselected location, wherein the rail apparatus comprises a rail system configured to attach to a surface; such that a multi-axis carriage is configured to be coupled to the rail system, move along the rail system, and move the riveting tool in axes relative to the surface; such that the riveting tool is configured to be detachably coupled to a tool module, and the tool module is configured to be detachably coupled to the multi-axis carriage; and installing a rivet, using a controller configured to cause the riveting tool to install a number of rivets in the number of preselected locations in response to a second signal, at the current preselected location with a backing unit located at the current preselected location on a second surface on the structure opposite to the first surface.

14. The method of claim 13 further comprising:
placing a number of hanger brackets on the first surface of the structure;
attaching the rail system to the number of hanger brackets;
attaching the multi-axis carriage to the rail system;
coupling the tool module to the multi-axis carriage; and
mounting a tool to the tool module.

15. The method of claim 13 further comprising:
positioning the backing unit at the current preselected location; and
generating at least one of: the signal, and the second signal, in response to a signal generator.

16. A method for performing riveting operations on a structure, the method comprising:
moving a riveting tool mounted to a rail apparatus on a first surface of the structure to a preselected location within a number of preselected locations on the first surface of the structure in response to direct manipulation of the rail apparatus by a human operator to form a current preselected location, wherein the rail apparatus comprises a rail system configured to attach to a surface; such that a multi-axis carriage is configured to be coupled to the rail system, move along the rail system, and move the riveting tool in axes relative to the surface; such that the riveting tool is configured to be detachably coupled to a tool module, and the tool module is configured to be detachably coupled to the multi-axis carriage; and installing a rivet, using a controller configured to cause the riveting tool to install a number of rivets in the number of preselected locations in response to a signal, at the current preselected location with a backing unit located at the current preselected location on a second surface on the structure opposite to the first surface.

17. A method for performing riveting operations on a structure, the method comprising:
placing a number of hanger brackets on a first surface of the structure;
attaching a rail system for a rail apparatus to the number of hanger brackets, wherein the rail apparatus comprises the rail system configured to attach to the first surface when activated; a multi-axis carriage coupled to the rail system, wherein the multi-axis carriage is configured to move along the rail system and is configured to move a riveting tool in axes relative to the first surface; a tool module configured to be removably coupled to the multi-axis carriage, wherein the tool module comprises a frame and is configured to receive the riveting tool; and a controller configured to control movement of the riveting tool to a number of preselected locations on the surface of the structure and is configured to cause the riveting tool to install a number of rivets in the number of preselected locations in response to a signal;
attaching the multi-axis carriage to the rail system;
coupling the tool module to the multi-axis carriage;
mounting a tool to the tool module;
positioning a backing unit at a current preselected location;
generating the signal in response to a signal generator;
moving the riveting tool mounted to the rail apparatus on the first surface of the structure to a preselected location within the number of preselected locations on the first surface of the structure in response to the signal to form the current preselected location; and
installing a rivet at the current preselected location with the backing unit located at the current preselected location on a second surface on the structure opposite to the first surface.

* * * * *